(12) United States Patent
Hidaka et al.

(10) Patent No.: US 8,346,996 B2
(45) Date of Patent: Jan. 1, 2013

(54) INFORMATION PROCESSING SYSTEM

(75) Inventors: Youichi Hidaka, Tokyo (JP); Junichi Higuchi, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/062,255

(22) PCT Filed: Jul. 14, 2009

(86) PCT No.: PCT/JP2009/003287
§ 371 (c)(1),
(2), (4) Date: Mar. 4, 2011

(87) PCT Pub. No.: WO2010/050092
PCT Pub. Date: May 6, 2010

(65) Prior Publication Data
US 2011/0213902 A1    Sep. 1, 2011

(30) Foreign Application Priority Data
Oct. 29, 2008   (JP) ................................. 2008-278271

(51) Int. Cl.
*G06F 13/00* (2006.01)
(52) U.S. Cl. ........................................................ 710/33
(58) Field of Classification Search ................... None
See application file for complete search history.

(56) References Cited

U.S. PATENT DOCUMENTS
2009/0276773 A1 * 11/2009 Brown et al. ...................... 718/1

FOREIGN PATENT DOCUMENTS

| JP | 8-335144 A | 12/1996 |
|---|---|---|
| JP | 11-39103 A | 2/1999 |
| JP | 2002163140 A | 6/2002 |
| JP | 2003162439 A | 6/2003 |
| JP | 2004199420 A | 7/2004 |
| JP | 2004213435 A | 7/2004 |
| JP | 2006195821 A | 7/2006 |
| JP | 2007334764 A | 12/2007 |

OTHER PUBLICATIONS

International Search Report for PCT/JP2009/003287 mailed Oct. 20, 2009.
Multi-Root I/O Virtualization and Sharing Specification Revision 1.0, PCI-SIG, May 12, 2008, pp. 15-34.

* cited by examiner

*Primary Examiner* — Henry Tsai
*Assistant Examiner* — Juanito Borromeo

(57) ABSTRACT

An information processing system includes a plurality of processors for executing processing according to a predetermined processing request sent from a different device; a switching device for performing data transfer between the individual processors and the different device; and a storage device which is connected to the switching device and enables data transfer to and from the individual processors. At least one of the processors includes a processing request storing unit for storing processing request data sent from the different device to the processor, into the storage device by data transfer. At least another one of the processors includes a processing request reading unit for reading the processing request data stored in the storage device from the storage device by data transfer.

13 Claims, 23 Drawing Sheets

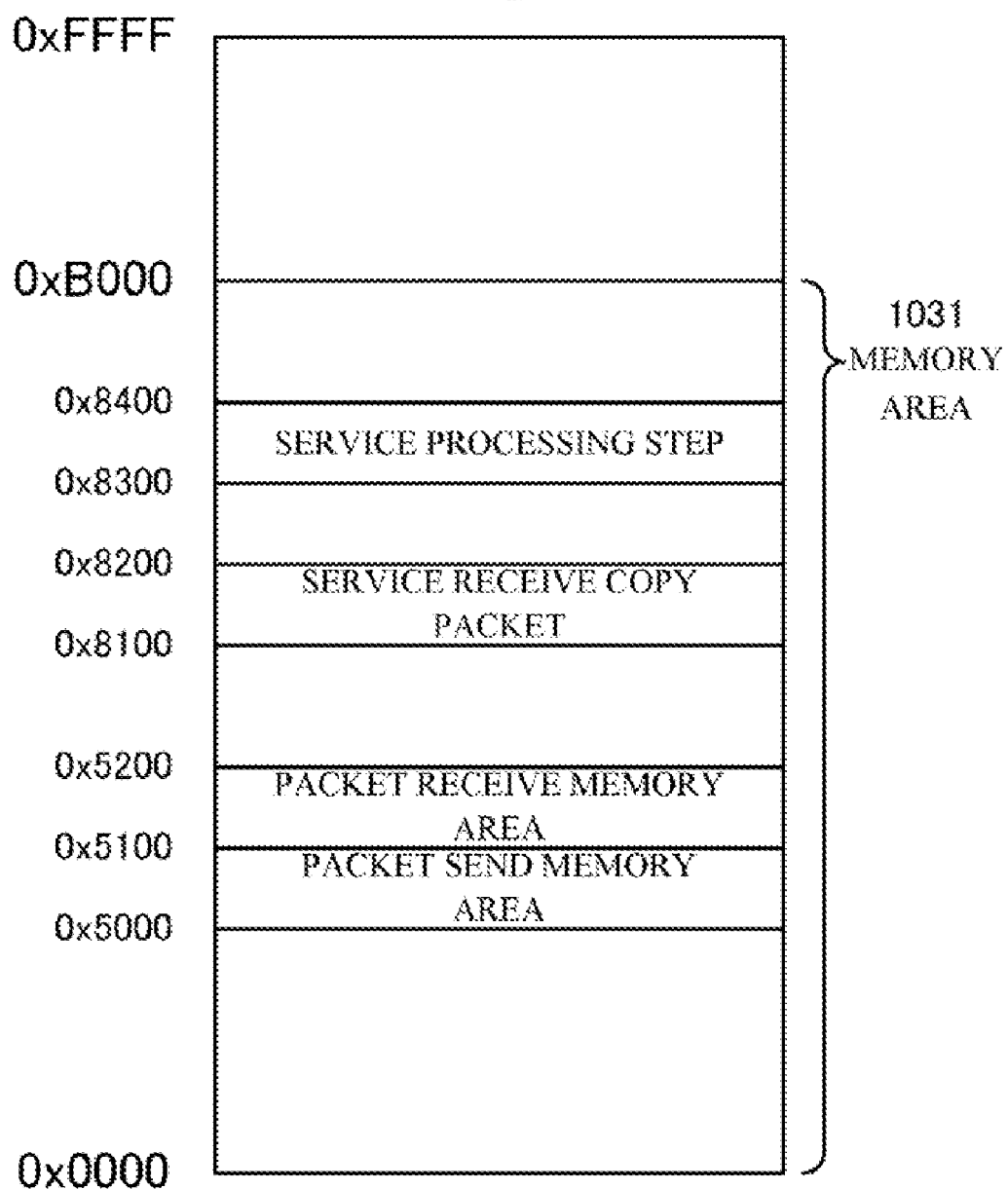

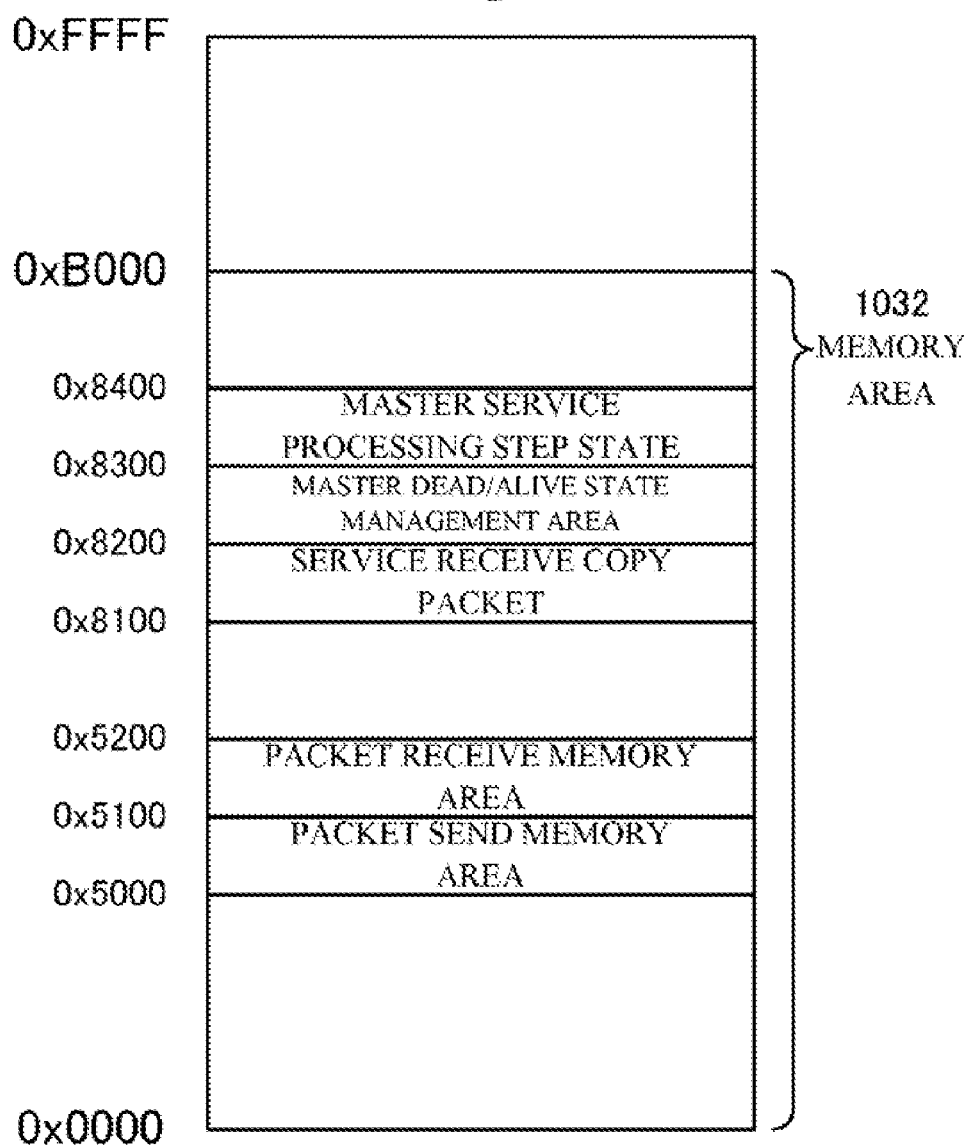

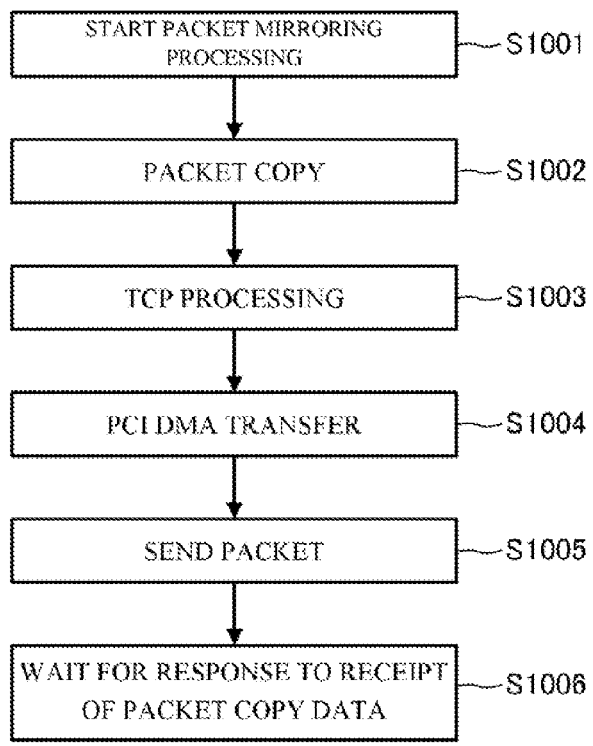
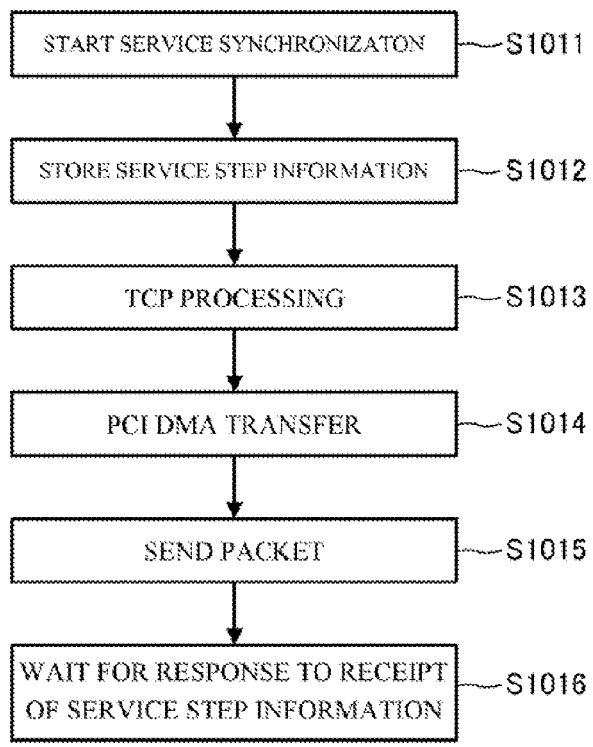

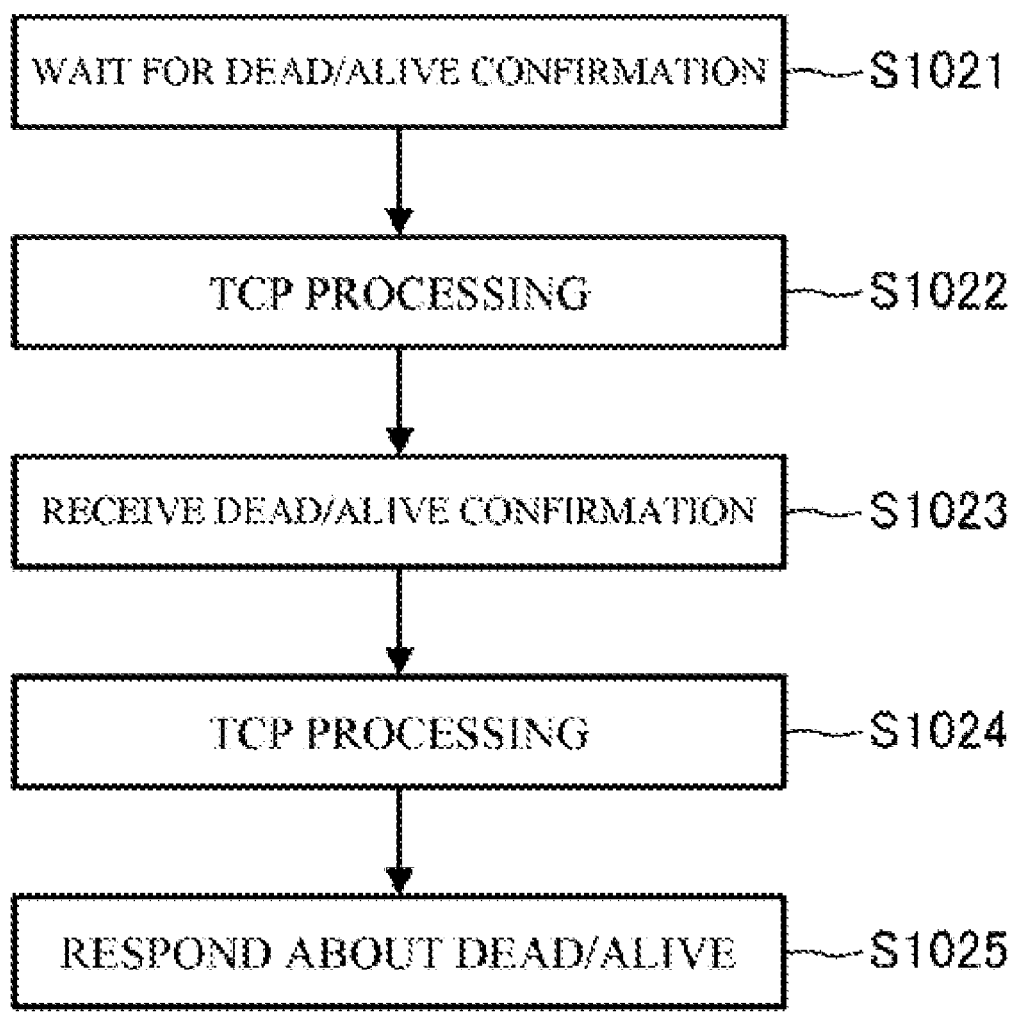

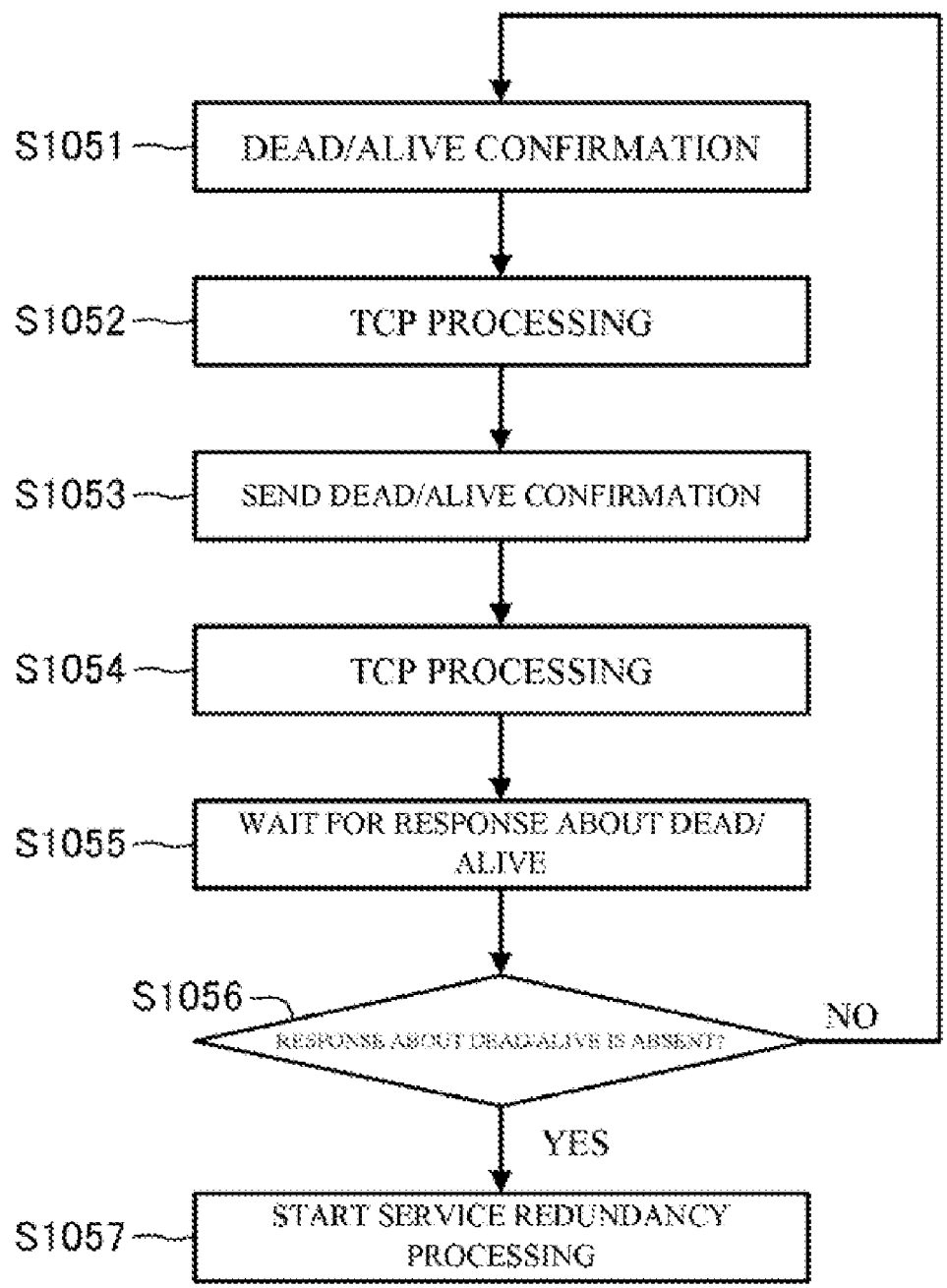

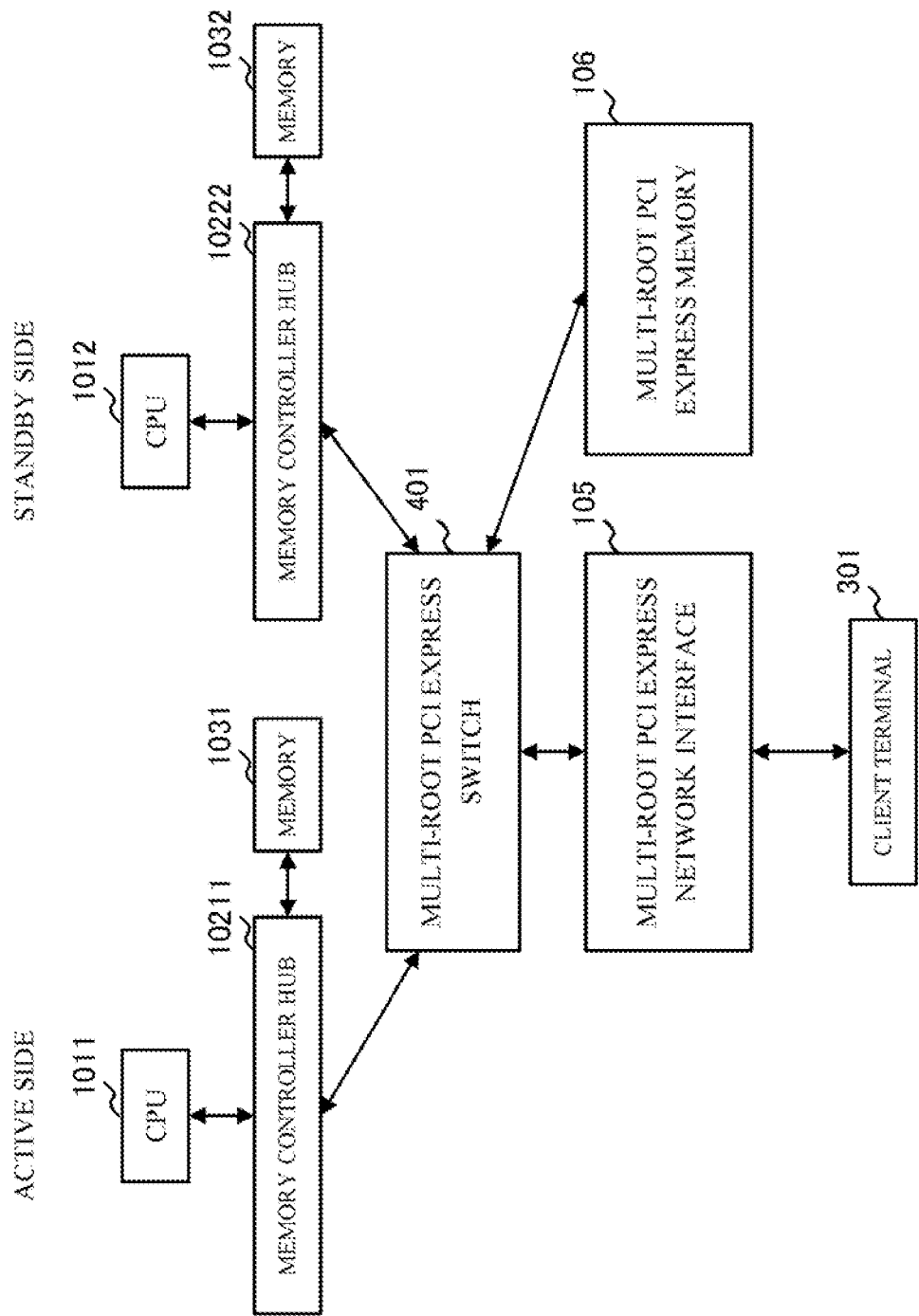

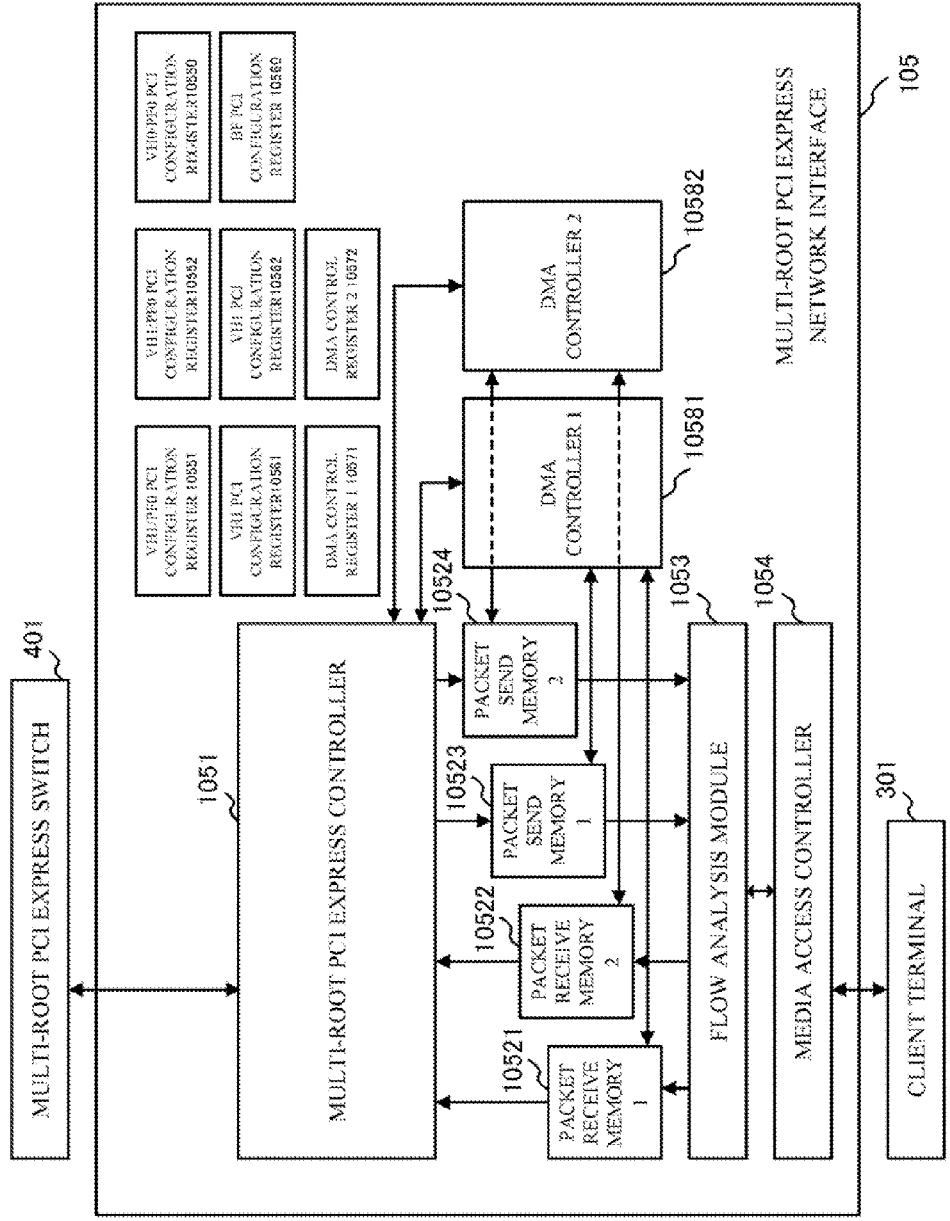

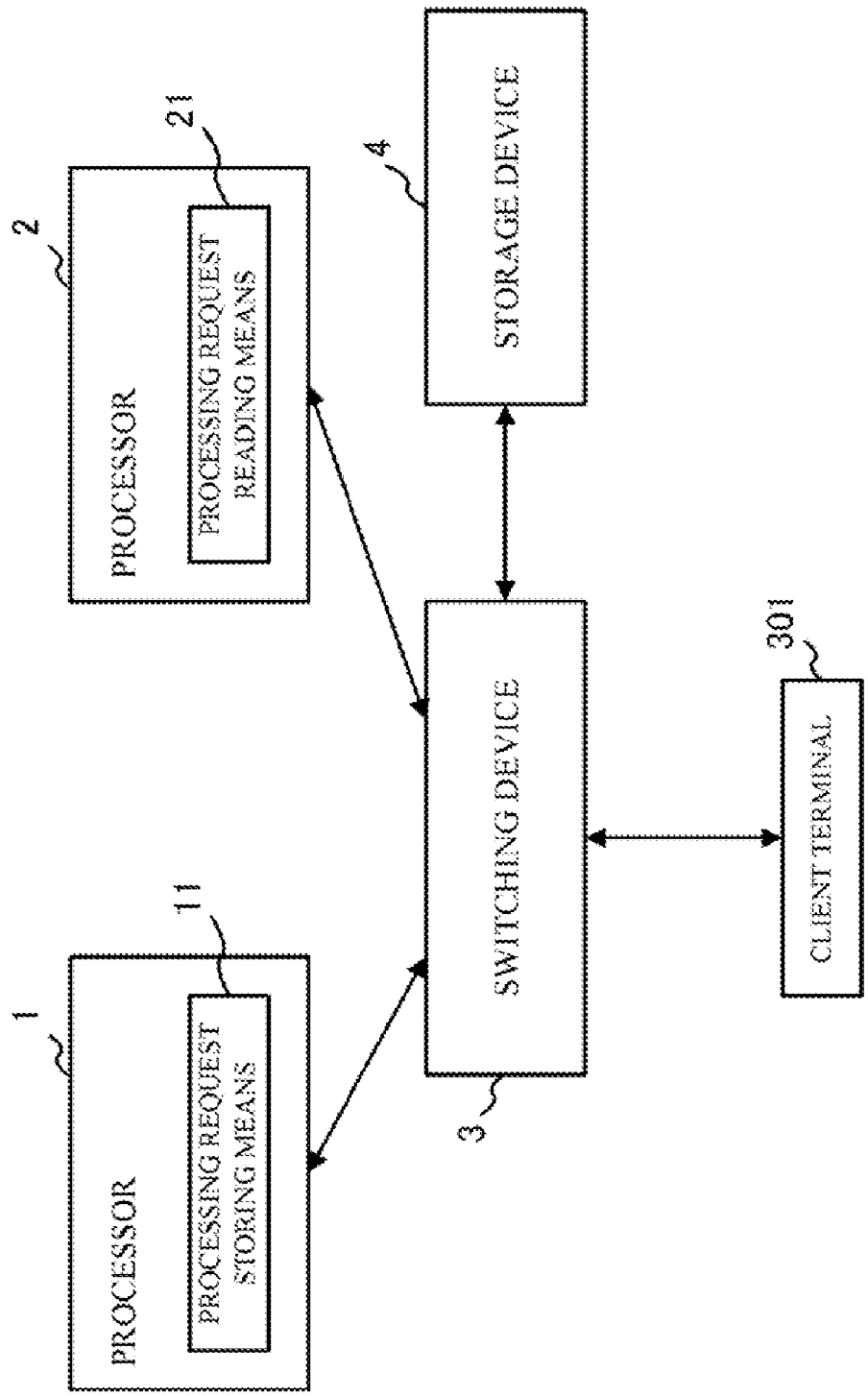

INFORMATION PROCESSING SYSTEM

TECHNICAL FIELD

The present invention relates to an information processing system and, in particular, to an information processing system including a plurality of processors adapted to achieve processing redundancy.

BACKGROUND ART

In the information processing system, such as a computer unit and a network unit, various service processing and protocol processing are performed in response to a request from a client terminal. A redundancy configuration and redundancy control are required to ensure the reliability of a central processing unit (CPU) within the system performing the service processing and the protocol processing.

FIG. 1 shows an example of the information processing system configuration for performing general CPU redundancy control. The configuration and the redundancy control operation are described below.

In the information processing system shown in FIG. 1, the active side and the standby side are respectively provided with a CPU, allowing the service to the client to be continued even during one CPU failure.

Specifically, the information processing system shown in FIG. 1 includes, firstly, a PCI (peripheral component interconnect) network interface 1041 for accepting a service request from the client terminal 301. This system also includes the CPU 1011, a memory controller hub 1021, and a memory 1031 as the active side configuration for processing the service request. This system also includes the CPU 1012, a memory controller hub 1022, and a memory 1032 as the standby side configuration used as a substitute during a failure on the active side.

The information processing system further includes a PCI bus switch 107 for performing exclusive connection control with respect to the active side and the standby side in the PCI network interface 1041. This system also includes PCI network interfaces 1042 and 1043 which are used as data passages of synchronization processing on the active side and the standby side, respectively.

In the configuration, the service request from the client is generally accepted through an input/output (I/O) connection interface. However, the PCI or PCI express device does not permit concurrent connections of a plurality of CPUs. Hence, a structure to perform exclusive control becomes necessary when establishing connection with the plurality of CPUs needed in the redundancy configuration, as in the case of the configuration described above.

FIG. 2 shows the internal configuration of the PCI network interface 1041 for accepting the service request from the client terminal 301. The PCI network interface 1041 includes a media access controller 10414 for processing network frames, a packet receive memory 10412 used upon receipt of a packet, and a packet send memory 10413 used when sending a packet.

The PCI network interface 1041 also includes a PCI bus controller 10411 for connection to a PCI connection interface, a direct memory access (DMA) controller 10417 for performing control during data transfer when sending/receiving a packet, a DMA control register 10416 as a control register thereof, and a PCI configuration register 10415 for setting an interface. All of the service request data from the client terminal are sent/received through the interface. When sending/receiving the data, the data read/write processing with respect to the CPUs are under control of the DMA controller 10417.

FIG. 3 shows a software stack operating on the active side CPU 1011. Similarly, FIG. 4 shows a software stack operating on the standby side CPU 1012. Service processing for processing the request from the client terminal 301, and the redundancy processing for performing redundancy control on the active side and the standby side are operated on these softwares. FIGS. 5 and 6 show memory address states controlled by the CPUs 1011 and 1012, respectively. Hereinafter, a series of operations of these CPUs 1011 and 1012, namely, the softwares that operate on these CPUs are described with reference to FIGS. 7A-7D and FIGS. 8A-8D. FIGS. 7A-7D are flowcharts illustrating the operations of the active side CPU 1011. FIGS. 8A-8D are flowcharts illustrating the operations of the standby side CPU 1012.

The software incorporated into the active side CPU 1011 shown in FIG. 3 configures an operating system 90 and a redundancy service application 80. On the operating system 90, in order to enable the redundancy service application 80 to send/receive data, a PCIDMA control section 903 operates which enables basic data send/receive by controlling a DMA controller of a PCI network interface card. Also, a network driver 902 for performing network packet processing, and a TCP/IP protocol stack 901 for performing network protocol processing, such as packet reach guarantee, operate on the operation system 90.

The redundancy service application 80 executes the following processing. That is, a packet send/receive processing section 802 receives a service request packet 8022 through the operating system 90 (step S101), and a service processing section 801 performs service processing and returns a service response packet 8021 to the client. On that occasion, the service request packet 8022 is subjected to DMA transfer (step S102), and then stored and processed in the main memory 1031 of the CPU 1011 (step S103). FIG. 5 shows the state of the main memory 1031 controlled by the CPU 1011, and indicates a memory region of the memory 1031. With respect to the main memory 1031, a receive packet is stored in a space "0×5100–5200," and a send packet is stored in a space "0×5000–0×5100."

The active side software performs redundancy control with the standby side in the process of the service processing. The redundancy control is for controlling so that the service can be taken over in the event of the CPU failure. Specifically, the software controls so that every time the packet send/receive processing section 802 receives a packet, a packet mirroring section 804 sends a service request copy packet 8041 to the standby side (refer to step S104, and steps S1001 to S1006 in FIG. 7B). In order to establish the synchronization of the service processing, the service processing section 801 controls so that a service synchronization processing section 803 sends a service processing phase synchronization packet 8031 to the standby side (refer to steps S105 and S106, and steps S1011 to S1016 in FIG. 7C). Then, a service processing phase synchronization response packet 8032 is received on the standby side, and the service processing is progressed on the active side upon confirmation of the synchronization establishment.

Thereafter, upon completion of the service processing on the active side (step S107), a service response packet 8021 as the processing result is sent to the client terminal 301 (steps S108, S109, and S110).

Hereat, the alive state of the active side is monitored all the time by a redundancy system alive monitoring section 807 of the standby side, a redundancy system dead/alive response section 805 periodically receives a keep-alive management packet 8051 from the standby side, and sends a dead/alive response packet 8052 (refer to steps S1021 to S1025 in FIG. 7D).

The standby side performs receive processing of the service request copy packet 8041 and the service processing phase synchronization packet 8031 sent from the active side as described above (refer to steps S121 and S122, steps S1031 to S1035 in FIG. 8B, and steps S1041 to S1046 in FIG. 8C). The redundancy system alive monitoring section 807 of the standby side confirms whether the active side is alive (refer to step S123, and steps S1051 to S1057 in FIG. 8D). When the dead/alive response packet 8052 is not received, a service processing redundancy control section 806 controls redundancy switching between the active side and the standby side (step S124).

The data related to the service request copy packet 8041 and service processing steps are stored at "0×8100–8200" and "0×8300–0×8400" in the memory 1031, as shown in FIG. 5, and the data are sent to the standby side. Similarly, various types of data sent from the active side are stored on the standby side, as shown in FIG. 6. Specifically, a service receive copy packet and a master dead/alive state management area are stored at "0×8100–8200" and "0×8200–8300" in the memory 1032, respectively.

In the redundancy switching control, according to a PCI bus switch setting 8061, a PCI bus switch 107 performs connection switching of a PCI network interface 1041 from a memory controller hub 1021 to a memory controller hub 1022. This causes the CPU 1012 to receive the service request from the client, and the standby side service processing section 801 controls to take over the service processing by using the information of the service request copy packet 8041 and the information of the service processing phase synchronization packet 8031 (steps S125 to S130).

Patent Document
  Patent document 1:. Japanese Unexamined Patent Application Publication No. 2006-195821. Non-patent Document
  Non-patent document 1: Multi-Root I/O Virtualization and Sharing Specification Revision 1.0, PCI-SIG, May 12, 2008, pp. 29

However, in the redundancy control described above, the data sending for the redundancy processing is required to ensure perfect data reachability. It is therefore necessary to use TCP processing through the TCP/IP protocol stack 901, the network driver 902, the PCI DMA control 903, and the PCI network interface 1042. This places a load on the CPUs, making it difficult to achieve high speed synchronization. Especially, there is the following problem that when the CPU 1011 performs the service processing, the copy processing of the service request packet necessary for the redundancy control, and the sending of the packet thereof double the CPU process load related to the packet sending and receiving, thus considerably deteriorating the system performance of the service processing.

The service request packet 8022 sent from the client terminal 301 is transmitted as the service request copy packet 8041 to the standby side under the redundancy control. Therefore, if a failure occurs in the active side CPU 1011, regarding the information not yet IS sent as the service request copy packet 8041, the data within the memory 1031 cannot be extracted. Thus, there arises the following problem that the packet information are lost, failing to perform perfect redundancy control.

SUMMARY

An exemplary object of the present invention is to improve process reliability while suppressing the system performance deterioration due to the redundancy control.

An information processing system according to an exemplary embodiment of the present invention includes: a plurality of processors for executing processing according to'a predetermined processing request sent from a different device; a switching device for performing data transfer between the individual processors and the different device; and a storage device which is connected to the switching device and enables data transfer to and from the individual processors. At least one of the processors includes a processing request storing device for storing processing request data sent from the different device to the processor, into the storage device by transferring the data thereto. At least another one of the processors includes a processing request reading unit for reading the processing request data stored in the storage device from the storage device by transferring the data therefrom.

An information processing system according to other exemplary embodiment of the present invention includes: a processor in operation and a processor in standby which execute processing according to a predetermined processing request sent from a different device; a switching device for performing data transfer between the individual processors and the different device; and a storage device which is connected to the switching device and enables data transfer to and from the individual processors. The processor in operation includes a processing request storing device for storing processing request data sent from the different device to the processor, in the storage device by transferring the data thereto. The processor IS in standby includes a processing request reading unit for reading the processing request data stored in the storage device, from the storage device by transferring the data therefrom.

A program according to other exemplary embodiment of the present invention is read in an information processing device including a plurality of processors for executing processing according to a predetermined processing request sent from a different device; a switching device for performing data transfer between the individual processors and the different device; and a storage device which is connected to the switching device and enables data transfer to and from the individual processors. The program includes instructions for causing at least one of the processors to implement a processing request storing device for storing processing request data sent from the different device to the processor, into the storage device by transferring the data thereto; and causing at least another one of the processors to implement a processing request reading unit for reading the processing request data stored in the storage device from the storage device by transferring the data therefrom.

An information processing method according to other exemplary embodiment of the present invention is applied to an information processing device including a plurality of processors for executing processing according to a predetermined processing request sent from a different device; a switching device for performing data transfer between the individual processors and the different device; and a storage device which is connected to the switching device and enables data transfer to and from the individual processors. The method includes storing processing request data sent from the different device to one processor, into the storage device by transferring the data thereto; and causing other processor to read the processing request data stored in the storage device from the storage device by transferring the data therefrom.

The present invention is thus configured to improve the process reliability while suppressing the system performance deterioration due to the redundancy control.

BRIEF DESCRIPTION OF THE DRAWINGS

FIG. 5 is a diagram showing a memory map of the active side CPU disclosed in FIG. 1;

FIG. 6 is a diagram showing a memory map of the standby side CPU disclosed in FIG. 1;

FIGS. 7A to 7D are flow charts showing the operation of the active side CPU disclosed in FIG. 1;

FIGS. 8A to 8D are flow charts showing the operation of the standby side CPU disclosed in FIG. 1;

FIG. 9 is a block diagram showing the configuration of an information processing system in a first exemplary embodiment;

FIG. 10 is a functional block diagram showing the internal configuration of a multi root PCI express network interface disclosed in FIG. 9;

FIG. 19 is a block diagram showing the configuration of an information processing system in a third exemplary embodiment.

EXEMPLARY EMBODIMENTS

<First Exemplary Embodiment>

Figure 11:
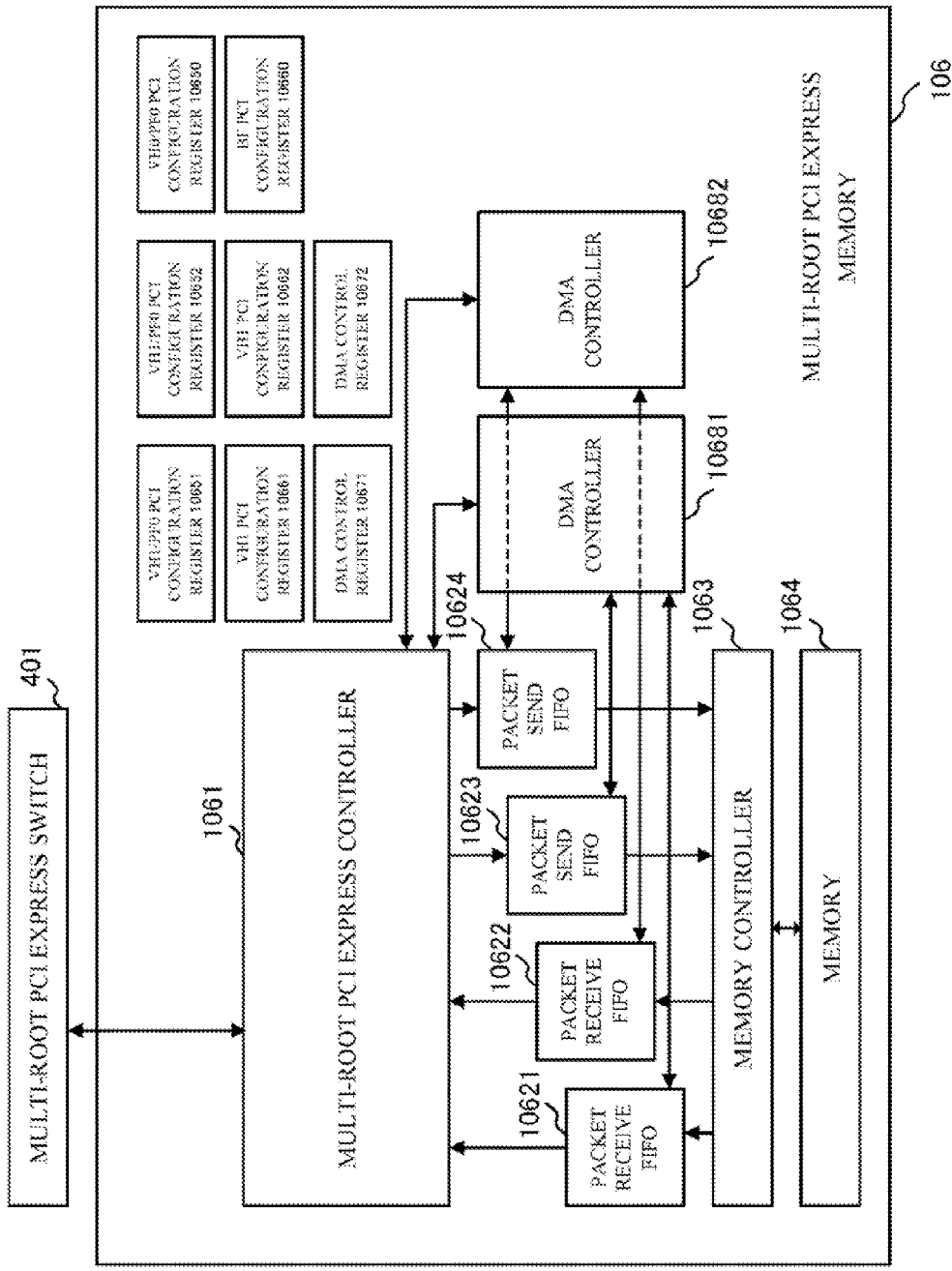
FIG. 11 is a functional block diagram showing the internal configuration of a multi root PCI express memory disclosed in FIG. 9.
Figure 12:
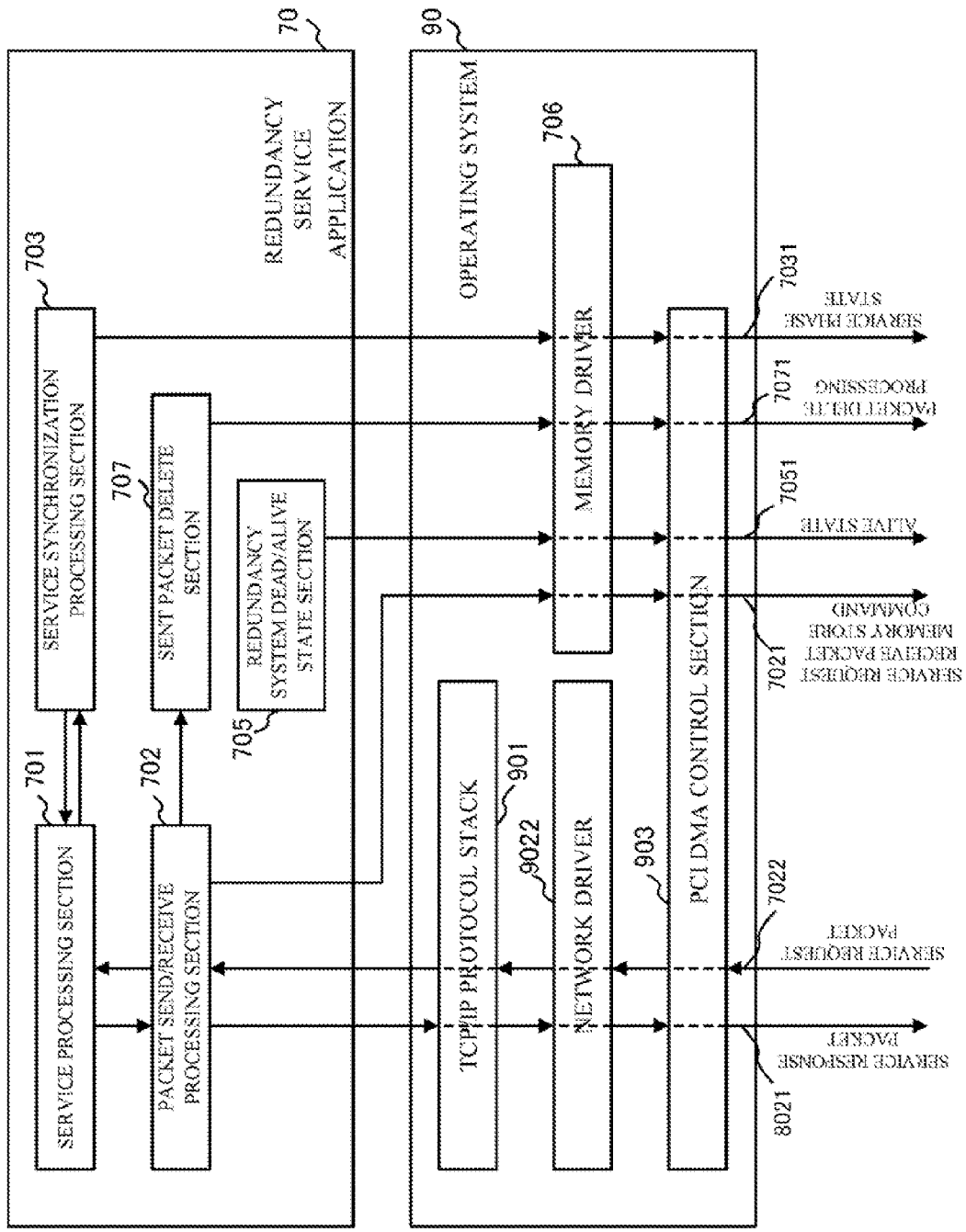
FIG. 12 is a functional block diagram showing the configuration of the active side CPU disclosed in FIG. 9.
Figure 13:
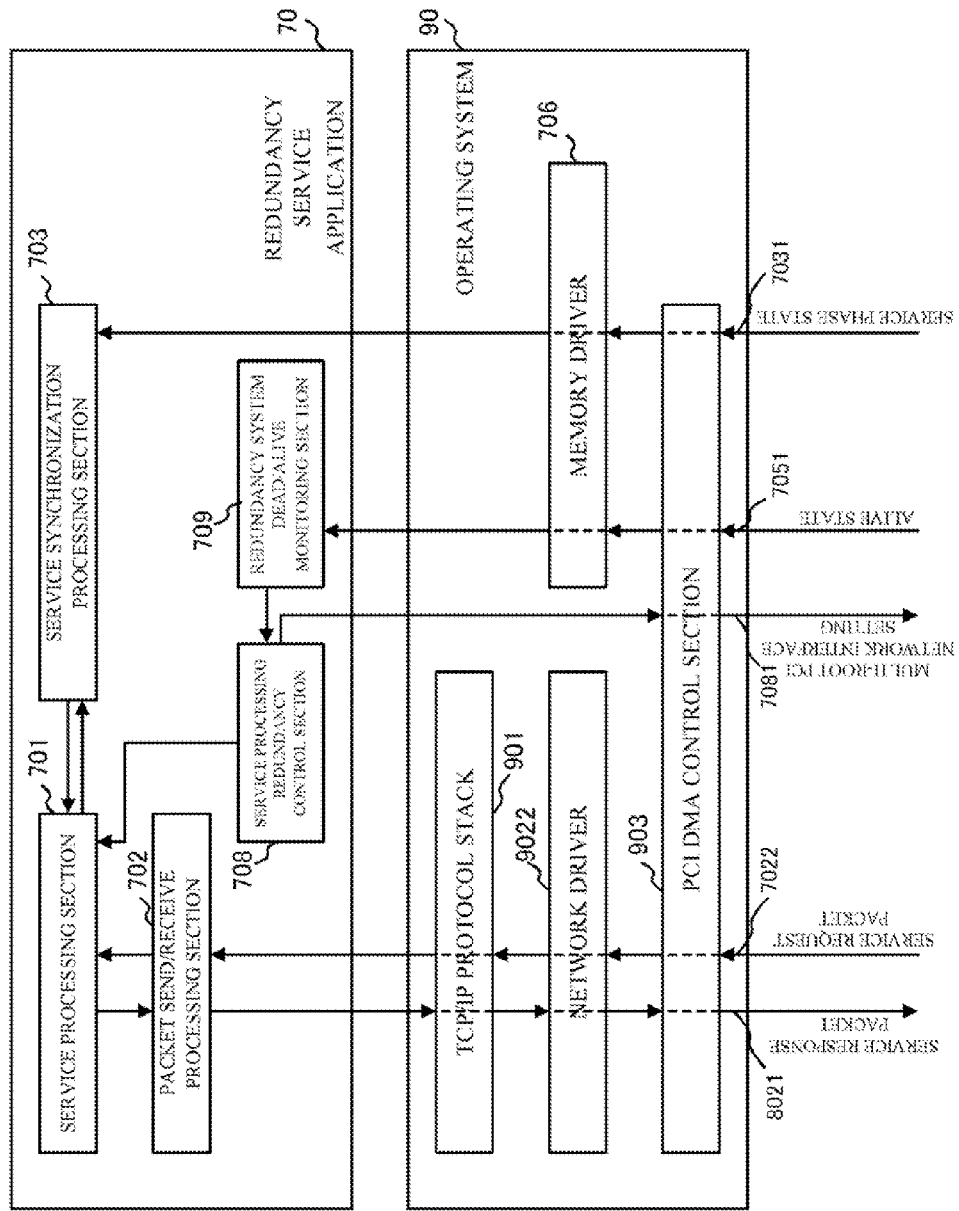
FIG. 13 is a functional block diagram showing the configuration of the standby side CPU disclosed in FIG. 9.
Figure 14:
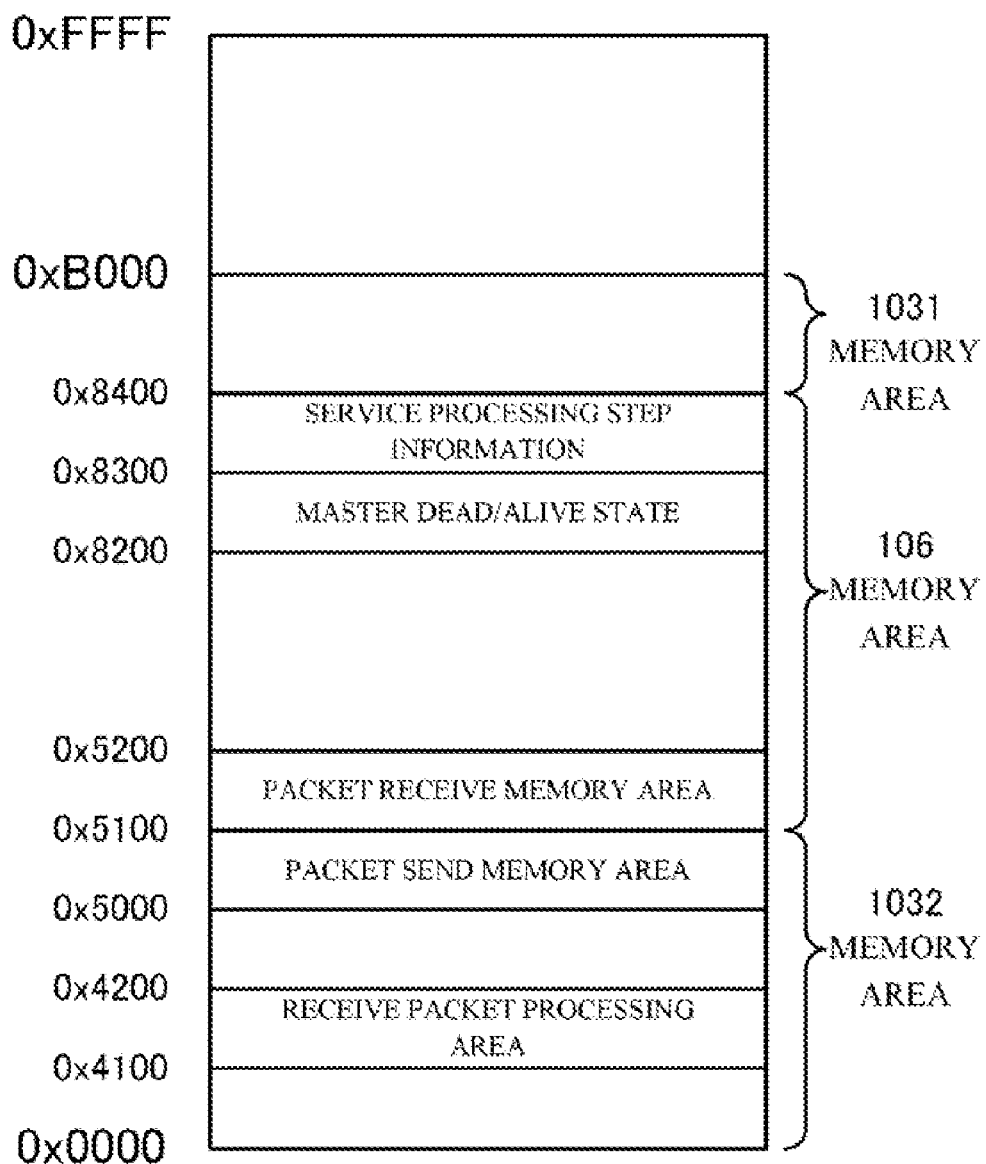
FIG. 14 is a diagram showing a memory map of the active side CPU disclosed in FIG. 9.
Figure 15:
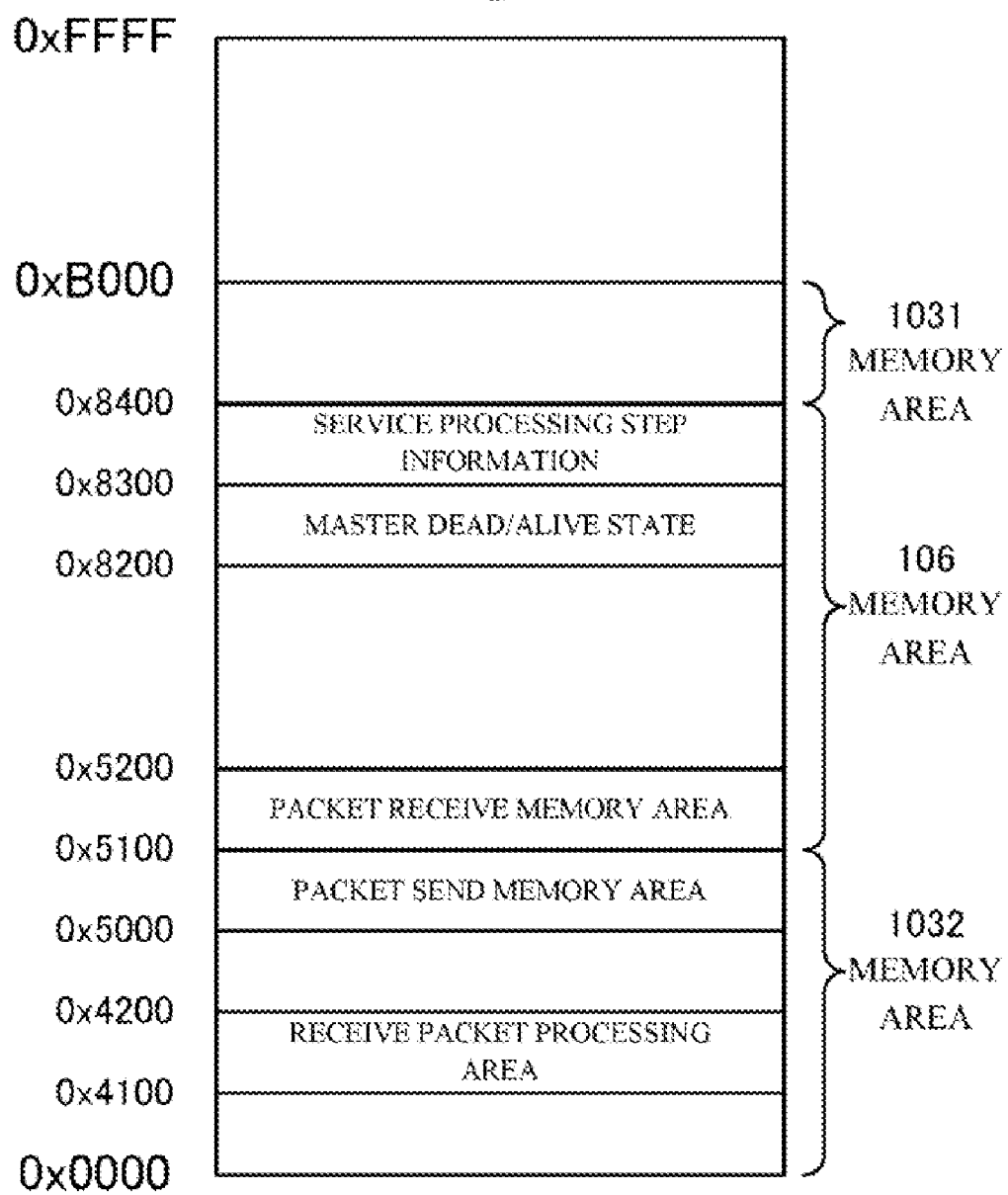
FIG. 15 is a diagram showing a memory map of the standby side CPU disclosed in FIG. 9.
Figure 16:
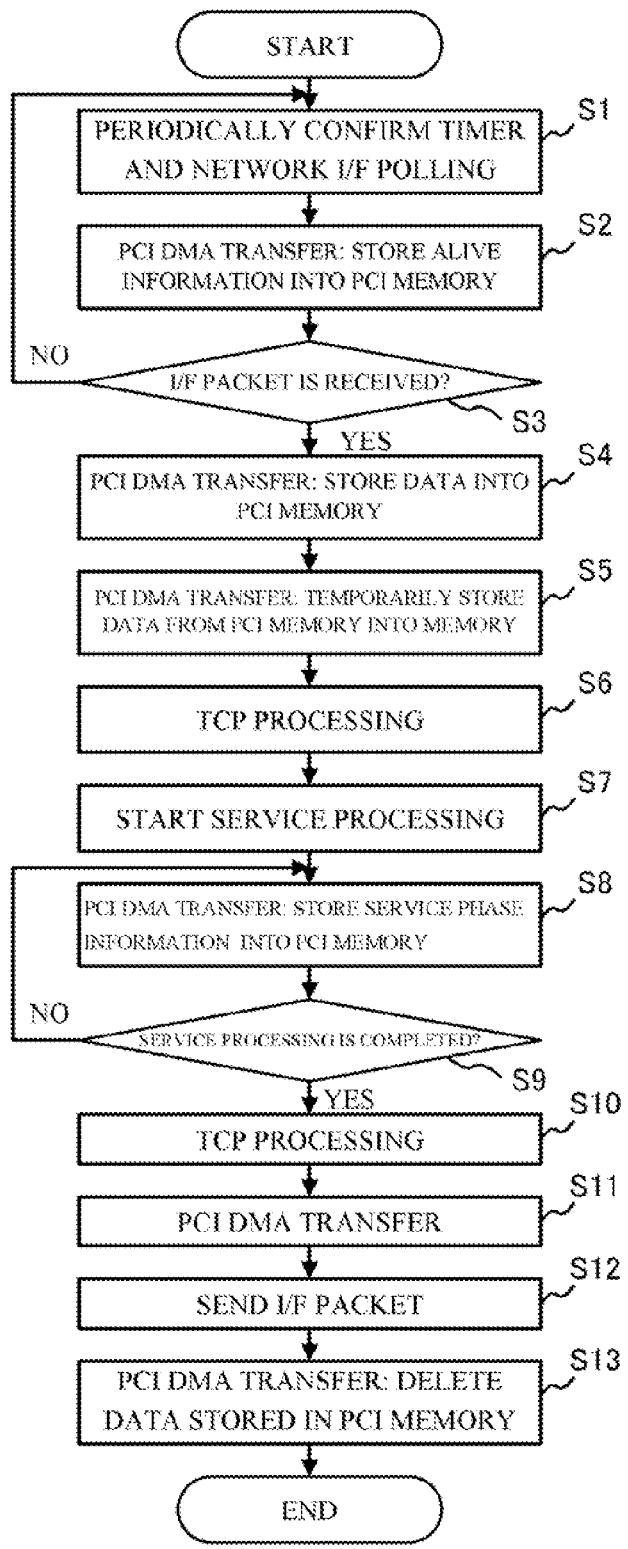
FIG. 16 is a flow chart showing the operation of the active side CPU disclosed in FIG. 9.
Figure 17:
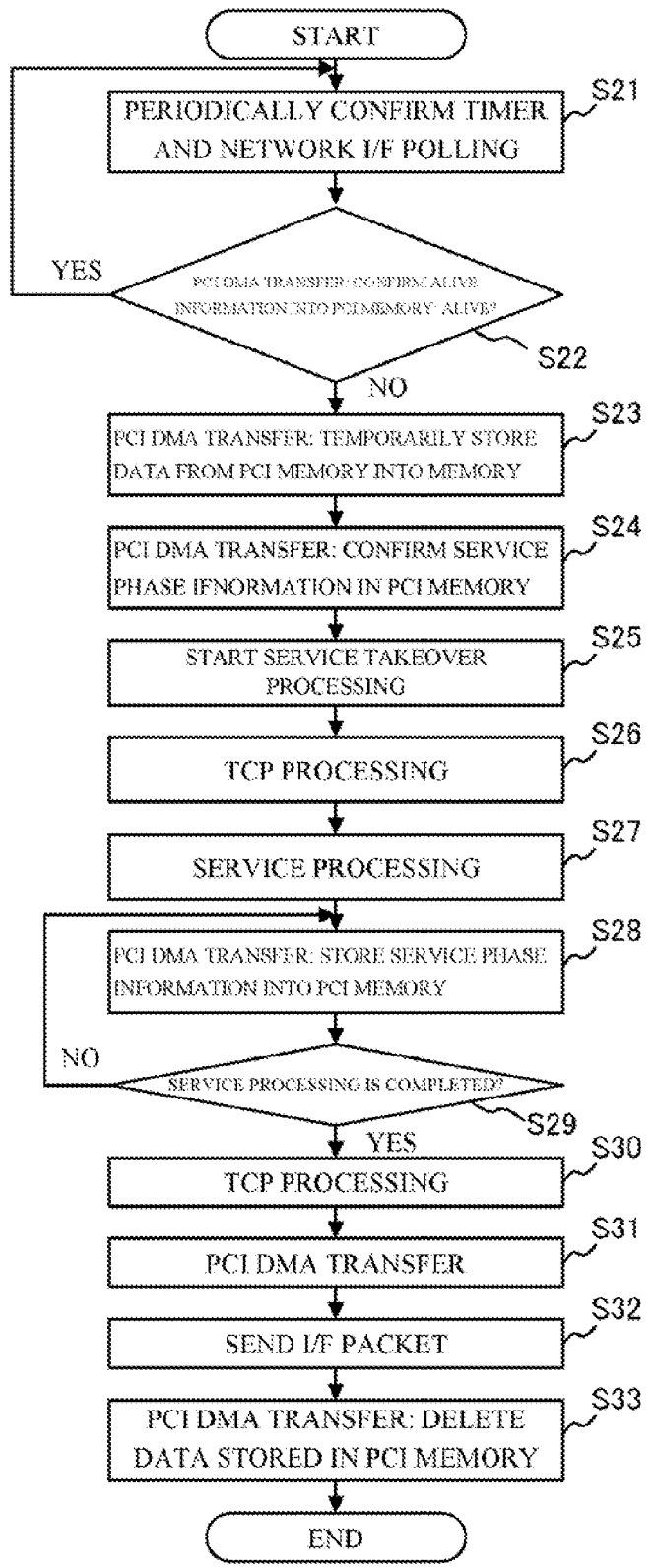
FIG. 17 is a flow chart showing the operation of the standby side CPU disclosed in FIG. 9.

A first exemplary embodiment of the present invention is described with reference to FIGS. 9 to 17. FIG. 9 is the block diagram showing the configuration of the information processor of the present invention. FIG. 10 is the functional block diagram showing the internal configuration of the multi root PCI network interface. FIG. 11 is the functional block diagram showing the internal configuration of the multi root PCI express memory. FIG. 12 is the functional block diagram showing the configuration of the active side CPU. FIG. 13 is the functional block diagram showing the configuration of the standby side CPU. FIG. 14 is the diagram showing the memory map in the active side CPU. FIG. 15 is the diagram showing the memory map in the standby side CPU. FIG. 16 is the flow chart showing the operation of the CPU. FIG. 17 is the flow chart showing the operation of the standby side CPU.

As shown in FIG. 9, the information processing system in the present exemplary embodiment includes the active side CPU 1011 (processor) in action, and the standby side CPU 1012 (processor) on standby. When a failure or the like occurs in the active side CPU 1011, the standby side CPU 1012 operates to continue the service to a client, thus establishing a redundancy configuration.

Specifically, the information processing system includes the CPU 1011, a memory controller hub 101211, and a memory 1031, as the active side configuration for processing a service request from a client terminal 301 (a different device), and includes the CPU 1012, a memory controller hub 10222, and a memory 1032, as the standby side configuration serving as a substitute during the active side failure.

The information processing system also includes a multi root PCI express switch 401 as a multi root aware (MRA) switch connected to these CPU 1011 and 1012 through these memory controller hubs 10211 and 10222, respectively. The information processing system further includes a multi root PCI express network interface 105 which is connected to the multi root PCI express switch 401 and accepts a service request from the client terminal 301 as an MRA device, and a multi root PCI memory 106 used for temporarily storing data of the service request or the like, as described later.

Figure 1:
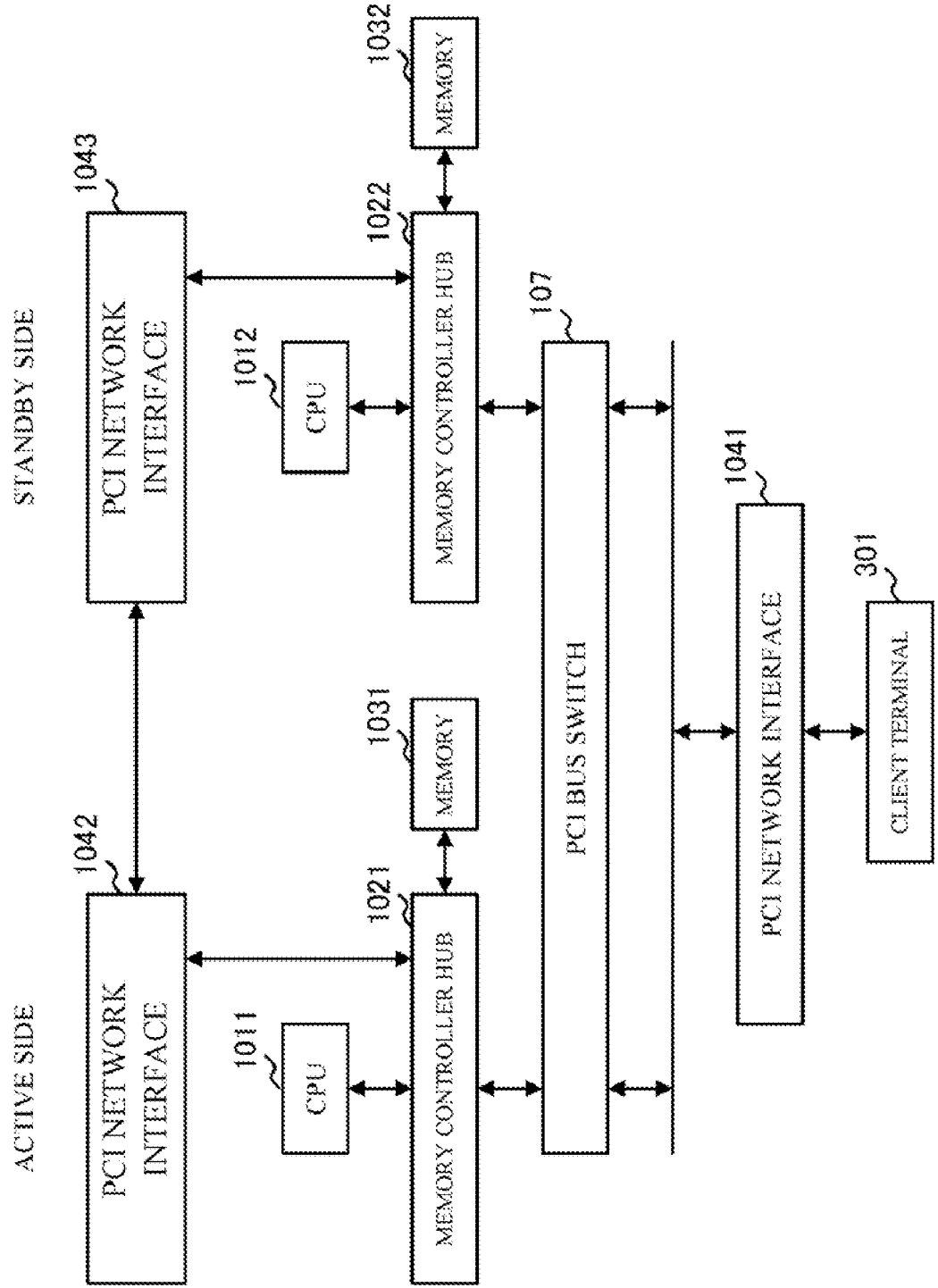
FIG. 1 is a block diagram showing the configuration of an information processing system related to the present invention.
Figure 2:
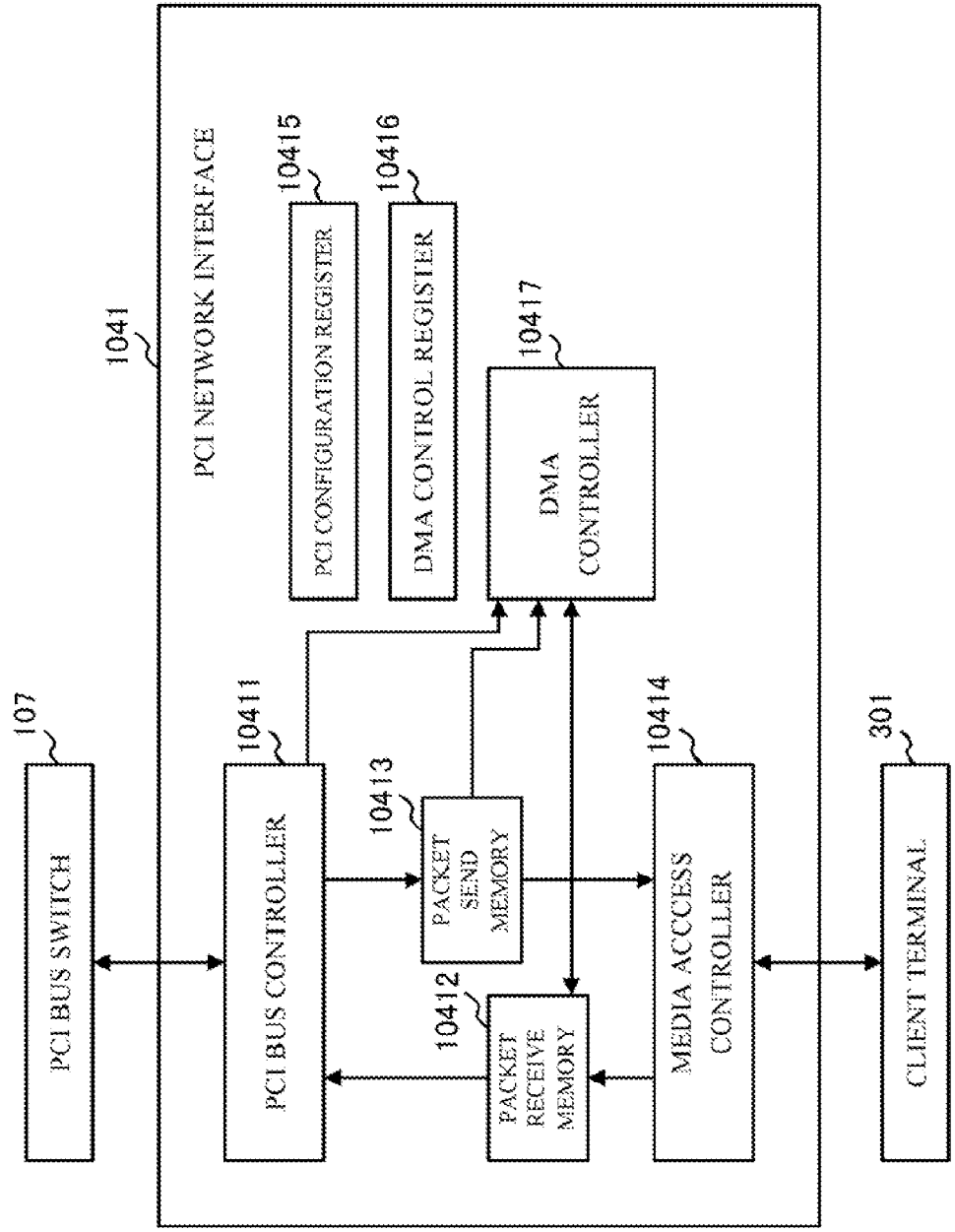
FIG. 2 is a block diagram showing the configuration of a PCI network interface disclosed in FIG. 1.
Figure 3:
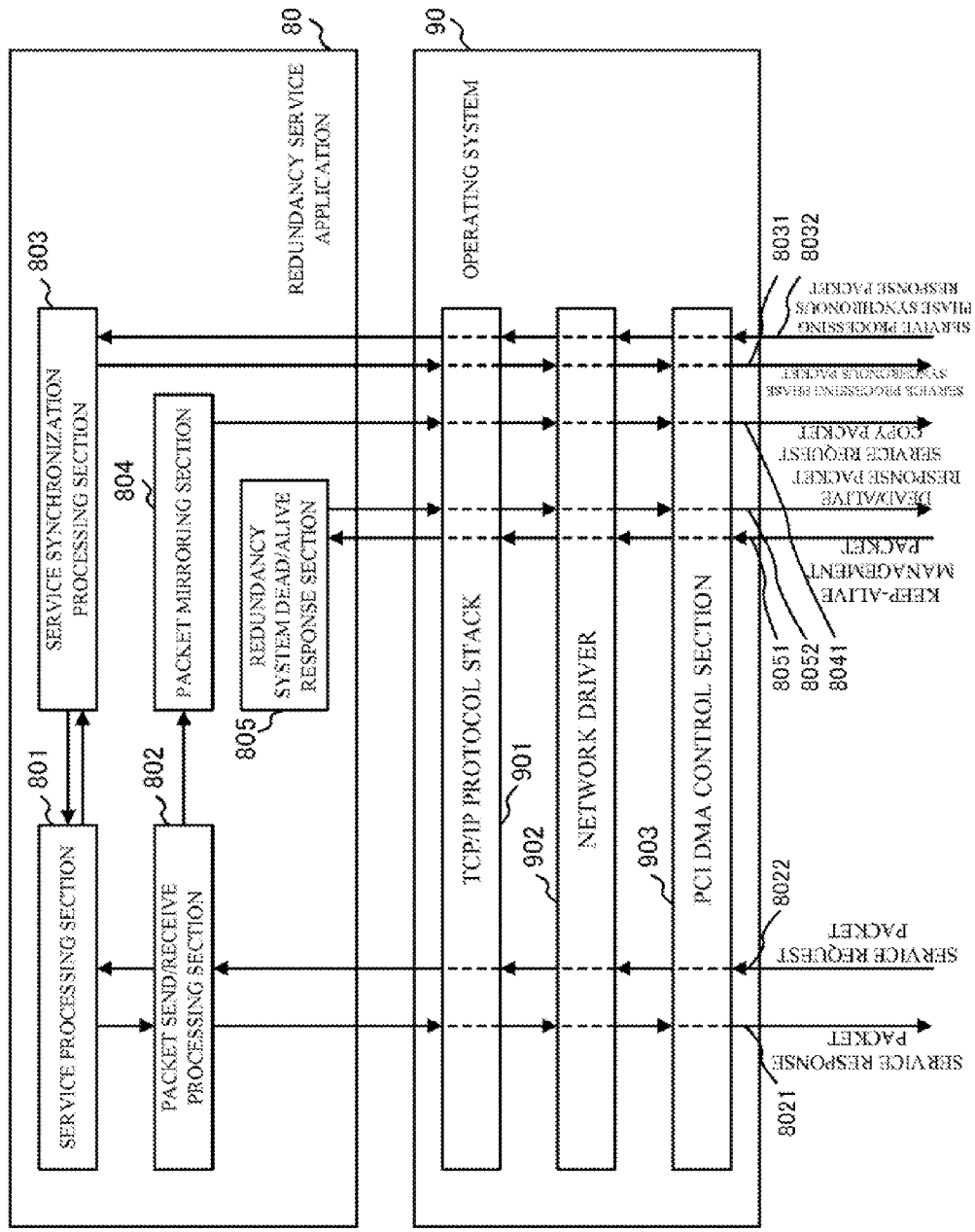
FIG. 3 is a functional block diagram showing the configuration of the active side CPU disclosed in FIG. 1.
Figure 4:
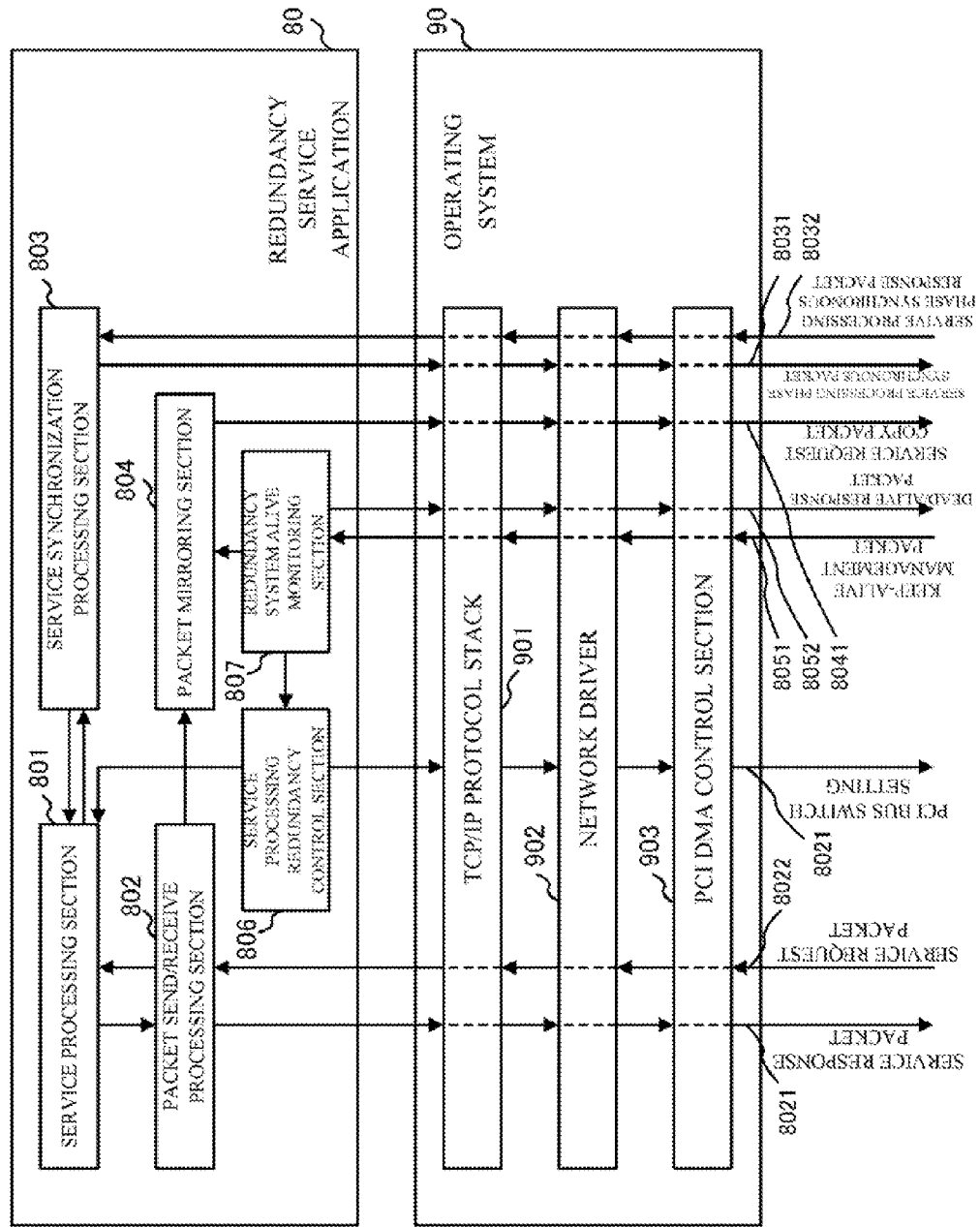
FIG. 4 is a functional block diagram showing the configuration of the standby side CPU disclosed in FIG. 1.
Figure 7A:
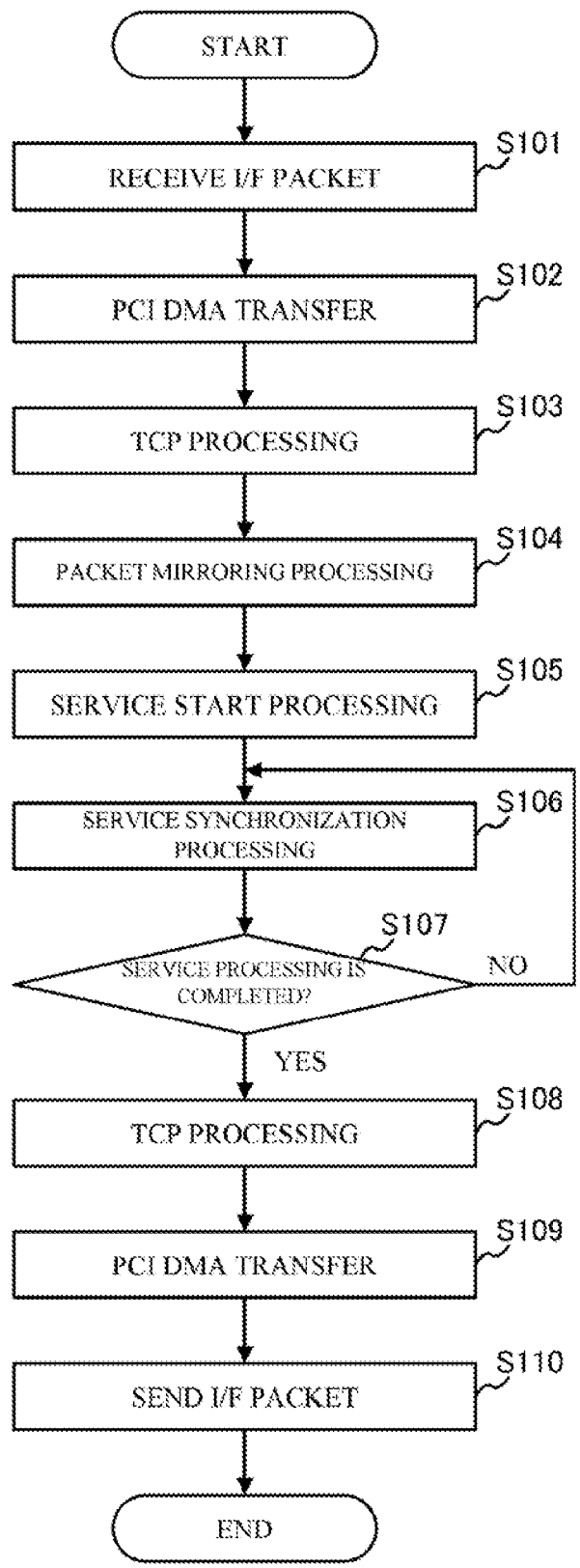
Figure 8A:
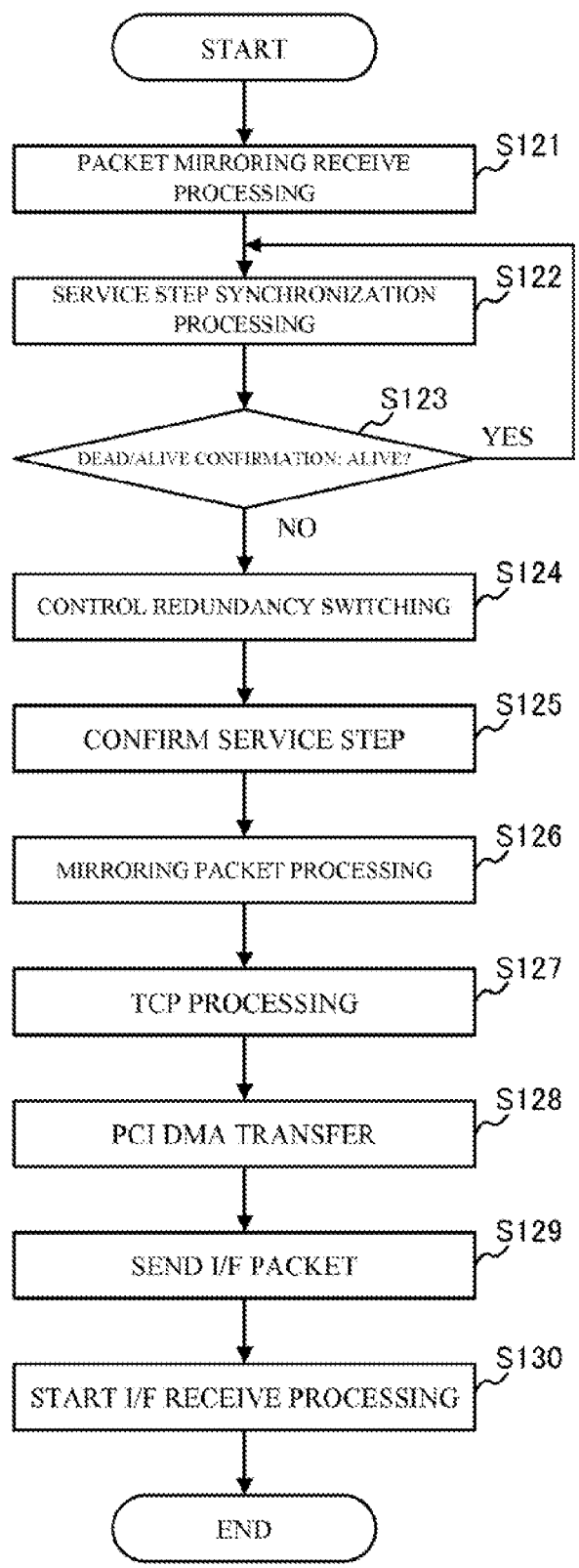
Figure 8B:
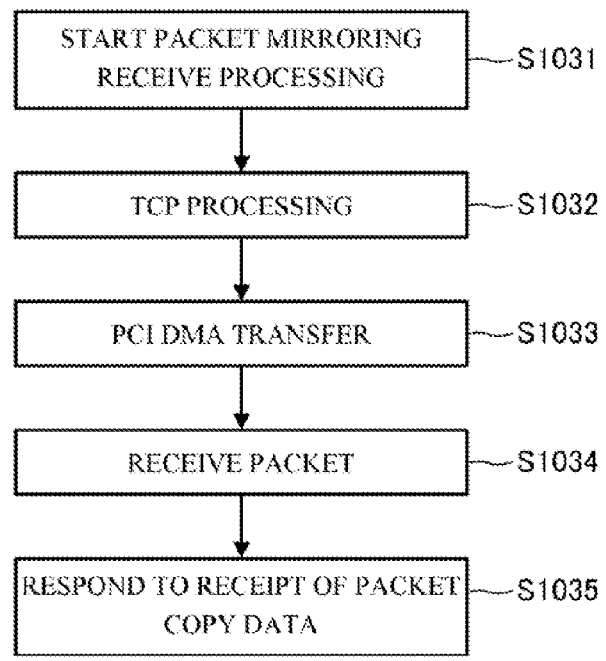
Figure 8C:
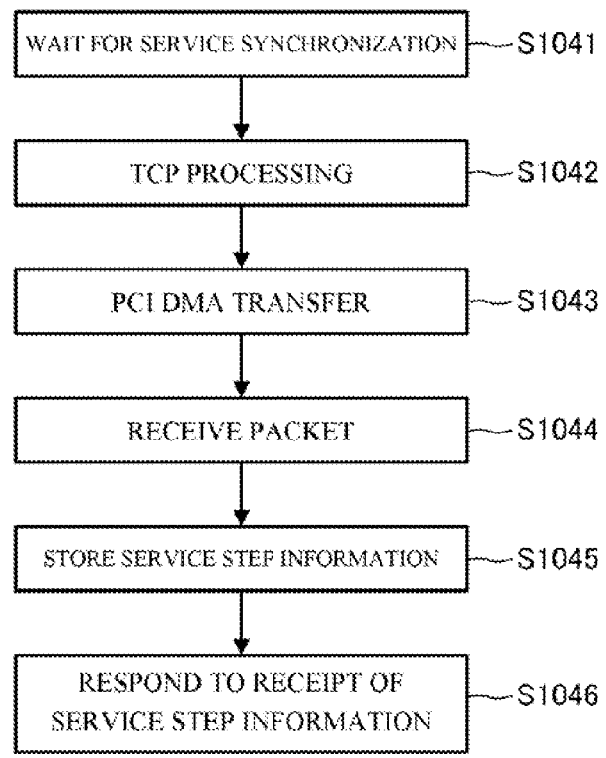

The service request from the client is generally accepted through an 110. In the case of using the MRA switch and the MRA device disclosed in the non-patent document 1 and the patent document 1, which expand the PCI and the PCI express as a general I/O connection interface, the connections from a plurality of CPUs are simultaneously allowed with respect to the I/O. This eliminates the need for a structure to perform exclusive control, such as the PCI bus switch 107 of the system disclosed in FIG. 1, and the like.

FIG. 10 shows the internal configuration of the multi root PCI express network interface 105 for accepting the service request from the client terminal 301. The multi root PCI express network interface 105 is, for example, a peripheral component interconnect express (PCI express) device. As described in the non-patent document 1, the multi-root PCI express controller 1051 is incorporated to achieve the configuration causing the CPU 1011 and CPU 1012 to simultaneously use the present network interface through the multi-root PCI express switch 401.

Specifically, the service request data from the client terminal 301 are subjected to network packet analysis by the media access controller 1054, and are distributed into the CPU 1011 or the CPU 1012 according to the contents set at a flow analysis module 1053. On that occasion, when the data are sent to/received from these CPUs, a packet receive memory 1 (10521) and a packet send memory 1 (10523) are used for the CPU 1011, and a packet receive memory 2 (10522) and a packet send memory 2 (10524) are used for the CPU 1012. Similarly to the system disclosed in FIG. 1 and the like, when sending/receiving the data, a DMA controller 1 (10581) and a DMA control register 1 (10571) are used in the CPU 1011, and a DMA controller 2 (10582) and a DMA control register 2 (10572) are used in the CPU 1012.

In a device corresponding to the multi-root PCI express, the basic settings of the device are stored in a VH0/PF0 PCI configuration register 10550 and a BF PCI configuration register 10560 in order to correspond to PCI configurations from a plurality of CPUs. PCI configuration settings with respect to the CPU 1011 are stored in a VH1/PF0 PCI configuration register 10551 and a VF1 PCI configuration register 10561. PCI configuration settings with respect to the CPU 1012 are stored in a VH1/PF0 PCI configuration register 10552 and a VF1 PCI configuration register 10562. Thereby, a memory area and the like used by the device are determined by the contents of the individual configuration registers.

FIG. 11 shows the internal configuration of the multi-root PCI express memory 106 (storage device) capable of storing data from the plurality of CPUs. As prescribed in the non-patent document 1, the multi-root PCI express memory 106 also similarly incorporates the multi-root PCI express controller 1061, thereby achieving the configuration to allow the CPU 1011 and CPU 1012 to simultaneously use the present network interface through the multi-root PCI express switch 401.

Memory addresses managed by the CPU are assigned to the multi-root PCI express memory 106 by the settings of a base address register of the PCI configuration register, and the data input to or output from the present memory are enabled upon data access to the assigned address area. As described later, the setting and access to the multi-root PCI express memory 106 can be controlled from the softwares respectively incorporated into the CPUs 1011 and 1012, through a memory driver. Therefore, upon the access by each of the CPU 1011 and CPU 1012 to the address corresponding to the same data, the data input to and output from the memory 106 are enabled.

When the data are sent to or received from these CPUs, the data input to or output from the memory 1064 are executed through a memory controller 1063 in which a packet receive FIFO 10621 and a packet send FIFO 10623 are used for the CPU 1011, and a packet receive FIFO 10622 and a packet send FIFO 10624 are used for the CPU 1012. Similarly to the system described above, when sending/receiving the data, a DMA controller 10681 and a DMA control register 10671 are used in the CPU 1011, and a DMA controller 10682 and a DMA control register 10672 are used in the CPU 1012.

In the device corresponding to the multi-root PCI express, the basic settings of the device are stored in a VH0/PF0 PCI configuration register 10650 and a BF PCI configuration register 10660 in order to correspond to PCI configurations from the plurality of CPUs. PCI configuration settings with respect to the CPU 1011 are stored in a VH1/PF0 PCI configuration register 10651 and a VF1 PCI configuration register 10661. PCI configuration settings with respect to the CPU 1012 are stored in a VH1/PF0 PCI configuration register 10652 and a VF1 PCI configuration register 10662. Therefore, a memory area and the like used by the device are determined by the contents of the individual configuration registers.

In the present exemplary embodiment, the settings are made to assign the memory area (indicated by reference numeral 106) to "0×5100–0×8400" in both of the CPU 1011 and CPU 1012, as shown in FIGS. 14 and 15. According to the settings, all the data input to or output from this area are executed on the multi-root PCI express memory 106. Then, as described later, by assigning the receive packet of the service request and the information for redundancy control to this memory address area the data are not stored in the memories 1032 and 1032, but are stored in the multi-root PCI express memory 106.

FIG. 12 shows the software stack operated on the active side CPU 1011. FIG. 13 shows the software stack operated on the standby side CPU 1012. These software stacks, namely, the configurations of the CPUs 1011 and 1012 are implemented by incorporating a program for the present invention into these CPUs.

As a basic software function, there is a function to execute the service processing for processing a request from the client terminal 301, and the processing for performing redundancy control on the active side and the standby side. As stated earlier, FIGS. 14 and 15 show the configuration of the memory address states managed by the CPUs 1011 and 1012, respectively. The configurations and a series of operations of these CPUs, namely, the software stacks are described below with reference of FIGS. 16 and 17.

The active side CPU 1011 shown in FIG. 12 builds the operating system 90 and a redundancy service application 70 by an incorporated program. On the operating system 90, IS in order to enable the redundancy service application 70 to send/receive data, the PCIDMA control section 903 operates which enables basic data send/receive by controlling the DMA controller of the multi-root PCI express network interface. Additionally, a multi-root network driver 9022 for performing network packet processing, a TCP/IP protocol stack 901 for performing network protocol processing such as packet arrival security, and a memory driver 706 for controlling data storing into the memory operate on the operating system 90.

A packet send/receive processing section 702 (a processing request storing means) of the redundancy service application 70 detects a service request packet (YES in step S3) by an interrupt notification received by the multi-root PCI express network interface 105 through the multi-root network driver 9022 of the operating system 90. Subsequently, the packet send/receive processing section 702 transfers, through the memory driver 706, the service request packet to the multi-root PCI express memory 106 by direct memory access (DMA) transfer under a service request receive packet memory store command 7021, and then temporarily stores the service request packet into the multi-root PCI express memory 106 (step S4, i.e., the processing request storing step).

Thereafter, the packet send/receive processing section 702 receives from the memory 106 the data stored on the multi-root PCI express memory 106, as a service request packet 7022, again by the DMA transfer (step S5). Then, a service processing 701 performs the service processing (steps S6 and S7), and returns a service response packet 8021 created by the processing to the client terminal 301 (steps S9, S10, S11, and S12). On that occasion, after the processing for the processing request is completed by returning the service response packet, the temporarily stored receive data, namely, the packet request packet on the multi-root PCI express memory 106 is deleted by a sent packet delete processing section 707 (a processing request delete means) (step S13). Specifically, the sent packet delete processing section 707 issues a packet delete processing command 7071 to the multi-root PCI express memory 106, and the service request packet data whose processing is terminated is deleted from the multi-root PCI express memory 106 (step S13).

The active side CPU 1011 also performs redundancy control together with the standby side in the process of the service processing, as described later. Hereat, in the redundancy control in the prior art, in order to take over the service during the CPU failure, it is necessary to notify information about mirroring and synchronization of the received packet to the standby side by TCP. On the other hand, in the present invention, the received service request packet is temporarily stored by DMA transfer into the multi-root PCI express memory 106, to which the standby side is also accessible, as described above. Hence, any copying process to increase the CPU load using the TCP does not occur. The received data are not deleted on the PCI express memory 106 until the service response packet is sent.

Therefore, even if a failure occurs during the time that CPU 1011 performs the service processing, the standby side CPU 1012 can take over the service processing without lack of the received data.

A redundancy system dead/alive state section 705 (an operating state storing means) of the active side CPU 1011 performs write operation of alive state data 7051 (operating state data) indicating that the CPU 1011 itself is normally operating on the multi-root PCI express memory 106 through the memory driver 706 by the DMA transfer. This processing is executed at constant time intervals, as shown in FIG. 16 (steps S1 and S2).

A service synchronization processing section 703 (an operating state storing means) of the active side CPU 1011, in order to establish synchronization of the service processing, performs write operation of a service phase state 7031 (process progress state data (operating state data)) on the multi-root PCI express memory 106 through the memory driver 706 by the DMA transfer. This processing is, for example, executed at constant time intervals (step S8) from the start of the service processing (step S7) to the completion of the service processing ("NO" in step S9), as shown in FIG. 16.

Thus, in the present exemplary embodiment, the data transfer between the CPU 1011 and the multi-root PCI express memory 106 is executed by PCI access, and therefore, the TCP processing imposing load on the CPU does not occur. Additionally, the copying process does not occur, thereby achieving high speed synchronization of the system as a whole.

FIG. 14 shows the memory map in the CPU 1011. In the space of the multi-root PCI express memory 106, "packet receive memory area" is stored in "0×5100–5200," "master dead/alive state" is stored in "0×8200–8300," and "service processing state is stored in "0×8300–8400." When the receive data on the multi-root PCI express memory 106 are used by the CPU 1011, read processing into a receive packet processing area "0×4100–4200" on the memory 1032 is performed. On the other hand, the send data after the service processing are stored on the memory 1032 of "0×5000–5100," and returned to the client as the service response packet 8021.

Similarly to the active side, the operating system 90 and the redundancy service application 70 are built in the standby side CPU 1012 by the incorporated software, as shown in FIG. 13. Although the configuration of the CPU 1012 is basically identical to that of the active side CPU 1011, the configuration includes a function for performing redundancy control (a redundancy processing means), as described below. In the following, only the different point is described, and the operation thereof is described with reference to FIG. 17.

Firstly, a redundancy system alive monitoring section 709 of the standby side CPU 1012 accesses to the multi-root PCI express memory 106 through the memory driver 706, and confirms an active side alive state 7051. The active side active state is confirmed at constant time intervals (steps S21 and S22). When the existence cannot be confirmed due to an abnormality occurrence in the active side CPU 1011 ("NO" in step S22), this is notified to the service processing redundancy control section 708, and the processing for taking over the service processing is started.

The service processing redundancy control section 708 controls the service processing section 701 so as to perform the redundancy processing. Specifically, firstly, the packet send/receive processing section 702 (the processing request reading means) reads, by the DMA transfer, the service request packet 7022 stored on the multi-root PCI express memory 106, and notifies it to the service processing section 701 (step S23, the processing request reading step).

Similarly, the service synchronization processing section 703 reads by the DMA transfer a service phase state 7031 as data indicating the state of progress on the active side stored on the multi-root PCI express memory 106, and notifies this to the service processing section 701 (step S24).

When the active side alive state cannot be confirmed as described above, the service processing section 701 executes processing according to the service request from the client terminal 301. Based on the read service phase state 7031, the service processing section 701 performs processing according to the state of progress on the active side, namely, takes over the processing executed on the active side (steps S25, S26, and S27).

Thereafter, a service response packet 8021 created as a result of the service processing by the service processing section 701 is returned (steps S29, S30, S31, and S32). On that occasion, after the processing with respect to the processing request is completed by returning the service response packet, the service request packet on the multi-root PCI express memory 106 is deleted (step S33).

In the process of the service processing, the standby side CPU 1012 also performs write operation by the DMA transfer a service phase state as being data indicating the state of progress of the processing based on the service request, on the multi-root PCI express memory 106 through the memory driver 706. This processing is, for example, executed at constant time intervals (step S28) from the start of the service processing (step S27) to the completion of the service processing ("NO" in step S29), as shown in FIG. 17.

The memory map in the CPU 1012 is shown in FIG. 15. In the space of the multi-root PCI express memory 106, the packet receive memory area is stored in "0×5100–5200," the master dead/alive state is stored in "0×8200–8300," and the service processing state is stored in "0×8300–8400." Using these information, synchronization and succession operations are enabled.

Thus, in the present exemplary embodiment, firstly, the service request packet from the client terminal is received by the multi-root PCI express network interface, and is sent to the active side CPU through the multi-root PCU express switch. On receipt of this, the active side CPU temporarily stores, by the DMA transfer, the service request packet into the multi-root PCI express memory connected to the multi-root PCI express switch. The service request packet is retained in the multi-root PCI express memory until the processing is completed on the active side CPU, and is readable from the standby side CPU by the DMA transfer. Hence, even when a failure occurs in the active side CPU, the standby side CPU can continue the processing in response to the service request by reading the service request packet from the multi-root PCI express memory. This prevents the lack of the service request packet, thereby achieving the assured redundancy configuration and improving the system reliability.

Further, the storing and reading of the service request packet by the respective CPUs with respect to the multi-root PCI express memory are carried out by the DMA transfer, thereby suppressing the load on the CPUs. As a result, a further improvement of the process reliability is achieved while suppressing the system performance deterioration caused by the redundancy control.

<Second Exemplary Embodiment>

Figure 18:
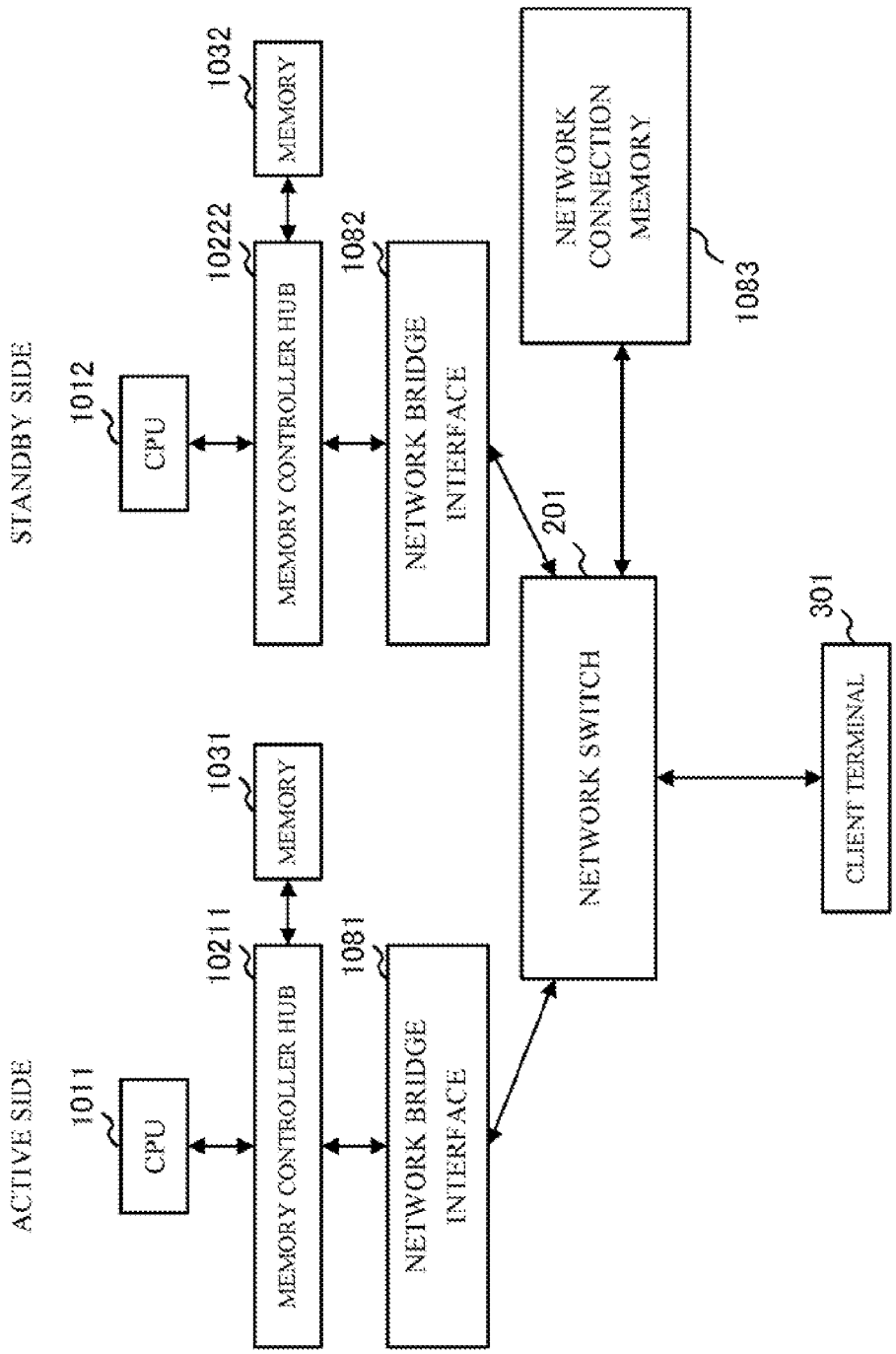
FIG. 18 is a block diagram showing the configuration of an information processing system in a second exemplary embodiment.

A second exemplary embodiment of the present invention is described with reference to FIG. 18. FIG. 18 is the block diagram showing the configuration of the information processing system in the present exemplary embodiment.

The information processing system in the present exemplary embodiment employs a configuration substantially similar to that of the first exemplary embodiment, and includes a network switch 201 (a switching device) on a network, in place of the multi-root PCI express switch. The service processing request from the client terminal 301 is received through the network switch 201. Correspondingly to this, network bridge interfaces 1081 and 1082 are incorporated.

The present exemplary embodiment further includes a network connection memory 1083 (a storage device) connected to the network switch 201 in place of the multi-root PCI express memory. The network connection memory 1083 enables data transfer between it and the CPUs 1011 and 1012 by the DMA transfer without using the TCP.

The individual CPUs 1011 and 1012 have the same configuration as described above. For example, the active side CPU 1011 temporarily stores, by the DMA transfer, the service request packet from the client terminal 301 into the network connection memory 1083, and reads again to execute the service processing. The standby side CPU 1012, when a failure or the like occurs in the active side CPU 1011, reads the service request packet from the network connection memory 1083 by the DMA transfer, and executes the service processing according thereto. Similarly to the above, with respect to the network connection memory 1083, the storing and reading of data indicating the alive state of the CPU, and data indicating the state of progress of the service processing are executed by the respective CPUs.

Thus, this configuration also prevents the lack of the service request packet, and achieves an assured redundancy configuration, thereby improving the system reliability. Additionally, the system performance deterioration caused by the redundancy control can be suppressed by reducing the load on the CPUs.

<Third Exemplary Embodiment>

A third exemplary embodiment of the present invention is described with reference to FIG. 19. FIG. 19 is the block diagram showing the configuration of the information processing system in the present exemplary embodiment. In the present exemplary embodiment, the outline of the information processing system is described.

As shown in FIG. 19, the information processing system in the present exemplary embodiment includes a plurality of processors 1 and 2 for executing processing according to a predetermined processing request sent from a different device; a switching device 3 for performing data transfer between these processors 1 and 2 and the different device 301; and a storage device 4 which is connected to the switching device 3 and enables data transfer to and from the individual processors 1 and 2.

At least the processor 1 includes a processing request storing means 11 for storing the processing request data sent from the different device 301 to the processor 1 into the storage device 4 by data transfer.

At least the processor 2 includes a processing request reading means 21 for reading the processing request data stored in the storage device 4, from the storage device 4 by data transfer.

According to the information processing system having the above configuration, firstly, a predetermined processing request is sent from the different device to one of the processors through the switching device. The processor which received this stores the processing request data into the storage device connected to the switching device by data transfer. The processor executes processing according to the processing request data. Another one of the processors reads by data transfer the processing request data stored in the storage device by the former processor. Thereby, the latter processor can recognize the processing request sent from the different device to the former processor, and the latter processor also handles the processing request. Therefore, the redundancy control to suppress leakage of processing with respect to the processing request from the different device can be achieved by the plurality of processors. On that occasion, the data transfer is performed by temporarily storing the processing request data in the storage device connected to the switching device, and it is therefore unnecessary to perform sending/receiving of the processing request data between the processors, thereby decreasing the load caused by the processing. As a result, the reliability of the processing can be improved while suppressing the system performance deterioration caused by the redundancy control.

The information processing system has the configuration that the processors and the storage device perform data transfer by direct memory access (DMA) transfer.

The data transfer required when storing and reading the processing request data sent from the processor to the storage device, and other data described later is carried out by the DMA transfer. This eliminates the need for direct data sending/receiving between the processors, and surely decreases the processing load on the processors, thereby suppressing the system performance deterioration.

The information processing system has the configuration that the processor including the processing request storing means reads the processing request data stored in the storage device by the data transfer, from the storage device by the data transfer, and executes the processing according to the read processing request data.

Thereby, the processing request data temporarily stored from one of the processors into the storage device are read again by the processor, and the processing according to the processing request data is executed. This further ensures that the processing request data requesting the processing executed by the processor are stored in the storage device, and further ensures that another one of processors recognizes the processing request to the former processor. As a result, redundancy can be improved.

The information processing system has the configuration that the processor including the processing request storing means includes a processing request delete means for controlling deletion of the processing request data stored in the storage device from the storage device upon completion of the execution of the processing based on the processing request data from the different device.

Thereby, when the processing is normally completed by one of the processors, the processing request data as the request for the processing are deleted from the storage device. Therefore, the completed processing request data are not read by another one of processors, thereby suppressing the unnecessary processing. As a result, an appropriate redundancy control can be achieved.

The information processing system has the configuration that the processor including the processing request reading means includes a redundancy processing means for executing processing according to the processing request data read from the storage device by the processing request reading means.

Thereby, another one of processors can execute processing to be processed by one of the processors, according to the processing request data read from the storage device. As a result, even if a failure or the like occurs in the latter processor, the redundancy processing can be achieved more surely, thus further improving the system reliability.

The information processing system has the configuration that the processor including the processing request storing means includes an operating state storing means for storing the operating state data indicating the operating state of the processor into the storage device by data transfer; and the redundancy processing means incorporated into the processor including the processing request reading means reads the operating state data stored in the storage device from the storage device by data transfer, and executes processing according to the processing request data read from the storage device based on the read operating state data by the processing request reading means.

The information processing system has the configuration that the operating state storing means incorporated into the processor including the processing request storing means stores the existence state data indicating whether the processor is operated or not, as the operating state data, into the storage device by data transfer.

The information processing system has the configuration that the redundancy processing means incorporated into the processor including the processing request reading means executes processing according to the processing request data read from the storage device by the processing request reading means, when determined that another one of the processors is not operated, based on the existence state data as the operating state data read from the storage device.

The information processing system has the configuration that the operating state storing means incorporated into the processor including the processing request storing means stores, as the operating state data, processing progress state data indicating the state of progress of the processing based on the processing request data from the different device, into the storage device by data transfer.

The information processing system has the configuration that the redundancy processing means incorporated into the processor including the processing request reading means continuously executes processing according to the processing request data read from the storage device by the processing request reading means, based on the processing progress state data as the operating state data read from the storage device.

Thereby, one of the processors stores data indicating its own operating state, for example, the state of progress of the processing according to data indicating whether it is operated or not, or the processing request data, into the storage device by data transfer. This allows another one of processors to read this and recognize the state of the former processor. According to the state of the former processor, the latter processor can therefore execute a proper processing with respect to the processing request data. For example, upon detection of a failure in the former processor, the latter processor can execute processing instead of the former processor, and can resume the processing from where the former processor left off This further improves the system reliability. By performing the data transfer of the data indicating the operating state to the storage device by the DMA transfer, the processing load on the processors can be further decreased, thereby suppressing the system performance deterioration.

The information processing system includes a peripheral component interconnect express (PCI Express) device as a connection device connected to the different device, and has the configuration that the switching device accepts the processing request data from the different device through the PCI express device.

An information processing system according to other exemplary embodiment of the present invention includes one processor in operation and another processor in standby which execute processing according to a predetermined processing request sent from a different device; a switching device for performing data transfer between the individual processors and the different device; and a storage device which is connected to the switching device and enables data transfer to and from the individual processors. The processor in operation includes a processing request storing means for storing processing request data sent from the different device to this processor, into the storage device by data transfer. The processor in standby includes a processing request reading means for reading the processing request data stored in the storage device, from the storage device by data transfer.

The information processing system has the configuration that data transfer between the individual processors and the storage device is performed by direct memory access (DMA) transfer.

A program according to other exemplary embodiment of the present invention is read in an information processing device including a plurality of processors for executing processing according to a predetermined processing request sent from a different device; a switching device for performing data transfer between the individual processors and the different device; and a storage device which is connected to the switching device and enables data transfer to and from the individual processors. The program causes at least one of the processors to implement a processing request storing means for storing processing request data sent from the different device to the processor into the storage device by data transfer, and causes at least another one of the processors to implement a processing request reading means for reading the processing request data stored in the storage device from the storage device by data transfer.

The program has the configuration for controlling so that data transfer between the individual processors and the storage device is performed by direct memory access (DMA) transfer.

An information processing method according to other exemplary embodiment of the present invention includes: in an information processing device including a plurality of processors for executing processing according to a predetermined processing request sent from a different device; a switching device for performing data transfer between the individual processors and the different device; and a storage device which is connected to the switching device and enables data transfer to and from the individual processors, storing processing request data sent from the different device to one of the processors into the storage device by data transfer; and causing another one the processors to read the processing request data stored in the storage device from the storage device by data transfer.

The information processing method has the configuration that data transfer between the individual processors and the storage device is performed by direct memory access (DMA) transfer.

Any one of the inventions of the program or the information processing method having the above configuration has the same action as the information processing system, thus achieving the object of the present invention.

The information processing systems in the present invention as described in the foregoing exemplary embodiments may be comprised of a single computer or a plurality of computers.

While the present invention has been described herein with reference to the foregoing exemplary embodiments, it is to be understood that the present invention is not limited thereto. Numerous changes and modifications which can be understood by those skilled in the art may be made in the configurations and details of the present invention within the scope of the present invention.

This application is based upon and claims the benefit of priority from Japanese Application No. 2008-278271. filed Oct. 29, 2008, which is hereby incorporated by reference herein in its entirety.

[Industrial Applicability]

The present invention is applicable to information processing systems having a redundancy configuration and including a plurality of CPUs, and hence has industrial applicability.

The invention claimed is:

1. An information processing system comprising:
a plurality of processors for executing processing according to a predetermined processing request sent from a different device;
a switching device for performing data transfer between the individual processors and the different device; and
a storage device which is connected to the switching device and enables data transfer to and from the individual processors,
wherein:
at least one of the processors comprises a processing request storing unit for temporarily storing processing request data sent from the different device to the processor into the storage device by data transfer,
at least another one of the processors comprises a processing request reading unit for reading the processing request data, sent from the one of processors which comprises a processing request storing unit and stored temporarily in the storage device, from the storage device by data transfer,
the processor comprising the processing request storing device reads again the processing request data stored temporarily in the storage device which enables data transfer to and from the individual processors by data transfer, from the storage device by data transfer, and executes processing according to the read processing request data, and
the processor comprising the processing request storing device comprises a processing request delete unit for controlling deletion of the processing request data stored temporarily in the storage device from the storage device upon completion of the execution of the processing based on the processing request data from the different device.

2. The information processing system according to claim 1, wherein data transfer between the processors and the storage device is performed by direct memory access (DMA) transfer.

3. The information processing system according to claim 1, wherein the processor comprising the processing request reading unit comprises a redundancy processing unit for executing processing according to the processing request data read from the storage device by the processing request reading unit.

4. The information processing system according to claim 3, wherein
the processor comprising the processing request storing device comprises an operating state storing unit for storing operating state data indicating an operating state of the processor into the storage device by data transfer, and
the redundancy processing unit incorporated into the processor comprising the processing request reading unit reads the operating state data stored in the storage device from the storage device by data transfer, and executes processing according to the processing request data read from the storage device by the processing request reading unit, based on the read operating state data.

5. The information processing system according to claim 4, wherein the operating state storing unit incorporated into the processor comprising the processing request storing device stores existence state data indicating whether the processor is operated or not, as the operating state data, into the storage device by data transfer.

6. The information processing system according to claim 5, wherein the redundancy processing unit incorporated into the processor comprising the processing request reading unit executes processing according to the processing request data read from the storage device by the processing request reading unit, when determined that another one of the processors is not operated, based on the existence state data as the operating state data read from the storage device.

7. The information processing system according to claim 4, wherein the operating state storing device incorporated into the processor comprising the processing request storing device stores, as the operating state data, processing progress state data indicating the state of progress of the processing based on the processing request data sent from the different device, into the storage device by data transfer.

8. The information processing system according to claim 7, wherein the redundancy processing unit incorporated into the processor comprising the processing request reading unit continuously executes processing according to the processing request data read from the storage device by the processing request reading unit, based on the processing progress state data as the operating state data read from the storage device.

9. The information processing system according to claim 1, further comprising a peripheral component interconnect express (PCI Express) device as a connection device connected to the different device, wherein the switching device accepts the processing request data from the different device through the PCI express device.

10. A computer-readable medium storing a program read in an information processing device comprising a plurality of processors for executing processing according to a predetermined processing request sent from a different device; a switching device for performing data transfer between the individual processors and the different device; and a storage device which is connected to the switching device and enables data transfer to and from the individual processors,
the program comprising instructions for causing at least one of the processors to implement a processing request storing device for temporarily storing processing request data sent from the different device to the processor into the storage device by data transfer;
causing at least another one of the processors to implement a processing request reading unit for reading the processing request data, sent from the one of processors and stored temporarily in the storage device, from the storage device by data transfer, and
the computer-readable medium storing the program read in the information processing device further comprising:
the program comprising instructions for causing the processor to implement the processing request storing device reads again the processing request data stored temporarily in the storage device which enables data transfer to and from the individual processors by data transfer, from the storage device by data transfer, and executes processing according to the read processing request data, and
the program comprising instructions for causing the processor to implement the processing request storing device comprises a processing request delete unit for controlling deletion of the processing request data stored temporarily in the storage device from the storage device upon completion of the execution of the processing based on the processing request data from the different device.

11. The computer-readable medium storing the program according to claim 10, wherein data transfer between the processors and the storage device is performed by direct memory access (DMA) transfer.

12. An information processing method comprising: in an information processing device including a plurality of processors for executing processing according to a predetermined processing request sent from a different device; a switching device for performing data transfer between the individual processors and the different device; and a storage device which is connected to the switching device and enables data transfer to and from the individual processors, temporarily storing processing request data sent from the different device to one of the processors, into the storage device by data transfer, and the one of the processor reads again the processing request data stored temporarily in the storage device by data transfer, from the storage device by data transfer, and executes processing according to the read processing request data;

controlling deletion of the processing request data stored temporarily in the storage device from the storage device upon completion of the execution of the processing based on the processing request data from the different device, and causing the another one of the processors to read the processing request data, sent from the one of processors and stored temporarily in the storage device, from the storage device by data transfer.

13. The information processing method according to claim 12, wherein data transfer between the processors and the storage device is performed by direct memory access (DMA) transfer.

* * * * *